US010023660B2

(12) United States Patent
Randall et al.

(10) Patent No.: US 10,023,660 B2
(45) Date of Patent: Jul. 17, 2018

(54) COMPOSITIONS CONTAINING PURIFIED NON-HEVEA RUBBER AND RELATED PURIFICATION METHODS

(71) Applicants: Bridgestone Corporation, Tokyo (JP); Amy M. Randall, Akron, OH (US)

(72) Inventors: Amy M. Randall, Akron, OH (US); Arif O. Gozen, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 604 days.

(21) Appl. No.: 14/401,749

(22) PCT Filed: May 16, 2013

(86) PCT No.: PCT/US2013/041422
§ 371 (c)(1),
(2) Date: Nov. 17, 2014

(87) PCT Pub. No.: WO2013/173625
PCT Pub. Date: Nov. 21, 2013

(65) Prior Publication Data
US 2015/0126673 A1 May 7, 2015

Related U.S. Application Data

(60) Provisional application No. 61/647,778, filed on May 16, 2012.

(51) Int. Cl.
C08C 1/00 (2006.01)
C08C 1/04 (2006.01)
C08C 2/02 (2006.01)
B01D 11/02 (2006.01)
C08L 7/00 (2006.01)

(52) U.S. Cl.
CPC ............ *C08C 2/02* (2013.01); *B01D 11/0288* (2013.01); *C08C 1/00* (2013.01); *C08C 1/04* (2013.01); *C08L 7/00* (2013.01)

(58) Field of Classification Search
CPC .... C08C 1/00; C08C 1/04; C08C 2/02; B01D 11/0288; C08L 7/00
USPC ........................................................ 524/425
See application file for complete search history.

(56) References Cited

U.S. PATENT DOCUMENTS

| 702,678 | A | 6/1902 | Prampolini |
| 741,258 | A | 10/1903 | Lawrence |
| 814,407 | A | 3/1906 | Von Stechow |
| 843,567 | A | 2/1907 | Bradshaw |
| 957,495 | A | 5/1910 | Chute et al. |
| 979,902 | A | 9/1910 | Van der Linde |
| 999,493 | A | 8/1911 | Ellis |
| 999,708 | A | 8/1911 | Ellis |
| 1,003,139 | A | 9/1911 | Kelley |
| 1,007,681 | A | 11/1911 | Ellis |
| 1,051,987 | A | 2/1913 | Chute |
| 1,103,903 | A | 7/1914 | Kendall |
| 1,105,568 | A | 7/1914 | Kendall |
| 1,135,236 | A | 4/1915 | Wheeler et al. |
| 1,161,135 | A | 11/1915 | Kaminski et al. |
| 1,167,264 | A | 1/1916 | Brooks |
| 1,189,549 | A | 7/1916 | Ellis |
| 1,189,550 | A | 7/1916 | Ellis |
| 1,242,886 | A | 10/1917 | Meyer |
| 1,247,814 | A | 11/1917 | Garza |
| 1,550,319 | A | 8/1925 | Hopkinson |
| 1,671,570 | A | 5/1928 | Carnahan |
| 1,695,676 | A | 12/1928 | Yeandle |
| 1,735,835 | A | 11/1929 | Kohno |
| 1,740,079 | A | 12/1929 | Edison |
| 1,753,184 | A | 4/1930 | Spence |
| 1,753,185 | A | 4/1930 | Spence |
| 1,829,502 | A | 10/1931 | Calcott et al. |
| 1,989,502 | A | 10/1931 | Calcott et al. |
| 1,833,287 | A | 11/1931 | Hadley |
| 1,903,500 | A | 4/1933 | Calcott |
| 2,138,895 | A | 12/1938 | Wiezevich |
| 2,187,146 | A | 1/1940 | Calcott et al. |

(Continued)

FOREIGN PATENT DOCUMENTS

| AU | 2012292924 A | 5/1942 |
| CN | 1442193 A | 4/2003 |

(Continued)

OTHER PUBLICATIONS

International Products Brochure 2007.
Abstract—Week 200365 Thomson Scientific, London, GB; AN 2003-682828; XP000002567182, JP 20030 040902 A (Nitto Denko Corp) (dated Feb. 13, 2003).
Adler, R.J. et al., Freeze Coagulation of ABS Latex, Ind. Eng. Chem. Res. vol. 36 pp. 2156-2162 (dated 1997).
ASTM International, Standard Test Methods for Rubber from Natural Sources—Chemical Analysis D 1278, 2002, pp. 246-251.
Bedane, G. M., et al., Development and Evaluation of a Guayule Debarker, Industrial Crops and Products, vol. 34, pp. 1256-1261 (2011).
Beintema, Nienke, Rubber From Dandelions and Shrubs, Wageningen World, No. 1, pp. 16-17, 2012.

(Continued)

*Primary Examiner* — Angela C Scott
(74) *Attorney, Agent, or Firm* — Meredith E. Hooker; Jenny L. Sheaffer

(57) ABSTRACT

Provided herein are organic solvent-based processes for the isolation of purified natural rubber from non-*Hevea* plants. The processes are particularly useful with plant matter that comprises at least 90% by weight roots sourced from *Taraxacum kok-saghyz* (Russian dandelion), *Scorzonera tau-saghyz* (Tau-Saghyz), *Scorzonera uzbekistanica*, and combinations thereof. Also provided herein is a purified non-*Hevea* rubber product containing 100 phr of rubber sourced from *Taraxacum kok-saghyz, Scorzon-era tau-saghyz, Scorzonera uzbekistanica*, and combinations thereof, having a specified purity level. Additionally provided are sulfur-vulcanizable rubber compounds and sulfur-vulcanized rubber compounds that incorporate 10-100 phr of purified non-*Hevea* rubber product sourced from *Taraxacum kok-saghyz, Scorzonera tau-saghyz, Scorzonera uzbekistanica*, and combinations thereof, having a specified purity level.

18 Claims, No Drawings

(56) References Cited

U.S. PATENT DOCUMENTS

| | | |
|---|---|---|
| 2,281,336 A | 4/1942 | Stacom |
| 2,364,394 A | 12/1944 | Sibley |
| 2,373,689 A | 4/1945 | Kenda |
| 2,387,521 A | 10/1945 | Martin |
| 2,390,860 A | 12/1945 | Williams |
| 2,399,156 A | 4/1946 | Stamberger et al. |
| 2,408,853 A | 10/1946 | Hoover et al. |
| 2,410,780 A | 11/1946 | Gracia |
| 2,410,781 A | 11/1946 | Gracia |
| 2,425,011 A | 8/1947 | Smith |
| 2,434,412 A | 1/1948 | Jones |
| 2,459,369 A | 1/1949 | Tint et al. |
| 2,475,141 A | 7/1949 | Jones |
| 2,522,136 A | 9/1950 | Schaffer |
| 2,549,763 A | 4/1951 | Banigan, Jr. et al. |
| 2,572,046 A | 10/1951 | Meeks et al. |
| 2,618,670 A | 11/1952 | Clark |
| 2,665,317 A | 1/1954 | Clark et al. |
| 2,744,125 A | 5/1956 | Meeks et al. |
| 3,141,281 A | 7/1964 | Guant et al. |
| 3,311,601 A | 3/1967 | Conley |
| 3,376,158 A | 4/1968 | Buser |
| 4,107,902 A | 8/1978 | Suggs |
| 4,122,012 A | 10/1978 | Blasnik |
| 4,136,131 A | 1/1979 | Buchanan |
| 4,159,903 A | 7/1979 | Bauman |
| 4,198,324 A | 4/1980 | Lal et al. |
| 4,243,561 A | 1/1981 | Lal et al. |
| 4,246,001 A | 1/1981 | Bauman |
| 4,272,436 A | 6/1981 | Lal et al. |
| 4,363,188 A | 10/1982 | Dastoor et al. |
| 4,376,189 A | 3/1983 | Trivette |
| 4,376,835 A | 3/1983 | Schmitt et al. |
| 4,376,853 A | 3/1983 | Gutierrez et al. |
| 4,405,532 A | 9/1983 | Gutierrez et al. |
| 4,410,656 A | 10/1983 | Coran et al. |
| 4,412,031 A | 10/1983 | Kitahara et al. |
| 4,412,041 A | 10/1983 | Kitahara et al. |
| 4,424,171 A | 1/1984 | Gutierrez et al. |
| 4,433,114 A | 2/1984 | Coran et al. |
| 4,434,266 A | 2/1984 | Trivette, Jr. |
| 4,435,337 A | 3/1984 | Kay et al. |
| 4,493,925 A | 1/1985 | Trivette, Jr. |
| 4,496,683 A | 1/1985 | Morita |
| 4,499,243 A | 2/1985 | Rader |
| 4,513,110 A | 4/1985 | Rader |
| 4,525,541 A | 6/1985 | Kitahara et al. |
| 4,526,929 A | 7/1985 | Kishida et al. |
| 4,526,959 A | 7/1985 | Kay et al. |
| 4,530,995 A | 7/1985 | Gutierrez et al. |
| 4,542,191 A | 9/1985 | Kay et al. |
| 4,557,306 A | 12/1985 | Graves |
| 4,559,378 A | 12/1985 | Kay et al. |
| 4,568,711 A | 2/1986 | Kay et al. |
| 4,570,690 A | 2/1986 | Graves |
| 4,585,826 A | 4/1986 | Graves |
| 4,591,631 A | 5/1986 | Beattie et al. |
| 4,591,632 A | 5/1986 | Moore |
| 4,609,336 A | 9/1986 | Stevenson et al. |
| 4,616,068 A | 10/1986 | Schloman, Jr. et al. |
| 4,616,075 A | 10/1986 | Malani et al. |
| 4,621,118 A | 11/1986 | Schloman, Jr. et al. |
| 4,622,365 A | 11/1986 | Scholman, Jr. et al. |
| 4,623,713 A | 11/1986 | Beinor et al. |
| 4,638,028 A | 1/1987 | Lui et al. |
| 4,647,607 A | 3/1987 | Kay et al. |
| 4,677,153 A | 6/1987 | Kitahara et al. |
| 4,678,860 A | 7/1987 | Kuester |
| 4,681,929 A | 7/1987 | Cole et al. |
| 4,684,715 A | 8/1987 | Kay et al. |
| 4,687,810 A | 8/1987 | Coran |
| 4,728,343 A | 3/1988 | Snyder |
| 4,739,037 A | 4/1988 | Kay et al. |
| 4,739,038 A | 4/1988 | Schloman, Jr. |
| 4,751,271 A | 6/1988 | Graves |
| 4,761,446 A | 8/1988 | Graves et al. |
| 4,762,870 A | 8/1988 | Graves et al. |
| 4,778,857 A | 10/1988 | Graves et al. |
| 4,786,683 A | 11/1988 | Schloman, Jr. et al. |
| 4,792,583 A | 12/1988 | Coran |
| 4,804,741 A | 2/1989 | Verbiscar et al. |
| 4,822,845 A | 4/1989 | Graves et al. |
| 4,829,117 A | 5/1989 | Schloman, Jr. et al. |
| 4,927,887 A | 5/1990 | Tate |
| 4,975,497 A | 12/1990 | Tate et al. |
| 4,983,729 A | 1/1991 | Sikora |
| 4,988,388 A | 1/1991 | Schloman |
| 5,247,009 A | 9/1993 | Kitahara |
| 5,272,203 A | 12/1993 | Joyner |
| 5,306,862 A | 4/1994 | Cappell et al. |
| 5,321,111 A | 6/1994 | Ji |
| 5,362,807 A | 11/1994 | Nogura et al. |
| 5,473,024 A | 12/1995 | Thames et al. |
| 5,580,942 A | 12/1996 | Cornish |
| 5,599,868 A | 2/1997 | Bohm et al. |
| 5,616,075 A | 4/1997 | Winstanley et al. |
| 5,633,433 A | 5/1997 | Backhaus et al. |
| 5,651,953 A | 7/1997 | Yokohama et al. |
| 5,717,050 A | 2/1998 | Cornish |
| 5,872,186 A | 2/1999 | Ang |
| 5,998,512 A | 12/1999 | Schloman |
| 6,014,998 A | 1/2000 | Mowdood |
| 6,054,525 A | 4/2000 | Schloman et al. |
| 6,132,711 A | 10/2000 | Backhaus et al. |
| 6,231,970 B1 | 5/2001 | Andersen et al. |
| 6,399,673 B1 | 6/2002 | Thames et al. |
| 6,482,884 B1 | 11/2002 | Schaal |
| 6,645,747 B1 | 11/2003 | Hallahan et al. |
| 6,734,245 B2 | 5/2004 | Baranek |
| 6,787,590 B2 | 9/2004 | Nakayama et al. |
| 6,818,676 B2 | 11/2004 | Koffler et al. |
| 7,026,678 B2 | 4/2006 | Coursey |
| 7,205,456 B2 | 4/2007 | Hallahan et al. |
| 7,259,231 B2 | 8/2007 | Cornish et al. |
| 7,540,438 B2 | 6/2009 | Buranov |
| 7,629,397 B2 | 12/2009 | McDonald et al. |
| 7,790,036 B2 | 9/2010 | Cornish et al. |
| 7,923,039 B2 | 4/2011 | Cornish et al. |
| 7,955,611 B2 | 6/2011 | Brown et al. |
| 8,013,213 B2 | 9/2011 | Mau et al. |
| 8,080,358 B2 | 12/2011 | Murakami |
| 8,241,873 B2 | 8/2012 | Diner et al. |
| 8,268,121 B2 | 9/2012 | Blount |
| 8,815,965 B2 | 8/2014 | Cole et al. |
| 9,138,660 B2 | 9/2015 | Yahamoto |
| 9,315,589 B2 | 4/2016 | Huang et al. |
| 9,328,211 B2 | 5/2016 | Nemato et al. |
| 9,546,224 B2 | 1/2017 | Cole et al. |
| 9,562,720 B2 | 2/2017 | Huang et al. |
| 9,567,457 B2 | 2/2017 | Huang et al. |
| 9,611,334 B2 | 4/2017 | Huang et al. |
| 9,637,562 B2 | 5/2017 | Huang et al. |
| 2002/0006987 A1 | 1/2002 | Nakayama |
| 2004/0265343 A1 | 12/2004 | Hill |
| 2005/0011812 A1 | 1/2005 | Nelson |
| 2005/0050759 A1 | 3/2005 | Chandran et al. |
| 2006/0070167 A1 | 4/2006 | Eng et al. |
| 2006/0106183 A1 | 5/2006 | Cornish et al. |
| 2006/0149015 A1 | 7/2006 | Cornish et al. |
| 2006/0217512 A1 | 9/2006 | Mau et al. |
| 2006/0218660 A1 | 9/2006 | Dong et al. |
| 2006/0225144 A1 | 10/2006 | Hallahan et al. |
| 2007/0265408 A1 | 11/2007 | Cornish et al. |
| 2007/0276112 A1 | 11/2007 | Buranov |
| 2008/0015336 A1 | 1/2008 | Cornish et al. |
| 2008/0172998 A1 | 7/2008 | Fraley et al. |
| 2008/0221246 A1 | 9/2008 | Imam et al. |
| 2008/0300526 A1 | 12/2008 | Gumbs |
| 2009/0054595 A1 | 2/2009 | Cornish et al. |
| 2009/0099309 A1 | 4/2009 | Gumbs |
| 2009/0099327 A1 | 4/2009 | Cornish et al. |
| 2009/0163689 A1 | 6/2009 | Cornish et al. |
| 2009/0191243 A9 | 7/2009 | Hill et al. |
| 2009/0199425 A1 | 8/2009 | Taylor |

(56) References Cited

U.S. PATENT DOCUMENTS

| | | | |
|---|---|---|---|
| 2011/0021743 A1 | 1/2011 | Cornish et al. | |
| 2011/0054051 A1 | 11/2011 | Cole et al. | |
| 2011/0275142 A1 | 11/2011 | Wade et al. | |
| 2014/0336288 A1 | 11/2014 | Cole et al. | |
| 2015/0018459 A1 | 1/2015 | Huang et al. | |
| 2015/0025214 A1 | 1/2015 | Huang et al. | |
| 2015/0073113 A1 | 3/2015 | Huang et al. | |
| 2015/0136882 A1 | 5/2015 | Huang et al. | |
| 2015/0184933 A1 | 7/2015 | Huang et al. | |
| 2015/0190848 A1 | 7/2015 | Huang et al. | |
| 2017/0081429 A1 | 3/2017 | Cole et al. | |
| 2017/0146291 A1 | 5/2017 | Huang et al. | |
| 2017/0152326 A1 | 6/2017 | Huang et al. | |
| 2017/0204204 A1 | 7/2017 | Huang et al. | |
| 2017/0226309 A1 | 8/2017 | Huang et al. | |

FOREIGN PATENT DOCUMENTS

| | | |
|---|---|---|
| CN | 1860850 A | 11/2006 |
| CN | 101671404 A | 3/2010 |
| CN | 101906176 A | 12/2010 |
| EA | 2011170418 A1 | 12/2011 |
| EP | 87109 A1 | 8/1983 |
| EP | 100434 A2 | 2/1984 |
| EP | 105822 A2 | 4/1984 |
| EP | 164137 A2 | 12/1985 |
| EP | 179211 A1 | 4/1986 |
| EP | 180716 A1 | 5/1986 |
| EP | 87109 B1 | 10/1986 |
| EP | 0039910 B1 | 4/1987 |
| EP | 105822 B1 | 6/1988 |
| EP | 180716 B1 | 4/1989 |
| EP | 164137 B1 | 6/1990 |
| EP | 476641 B1 | 3/1992 |
| EP | 491229 B1 | 6/1992 |
| EP | 0509768 A2 | 10/1992 |
| EP | 179211 B1 | 7/1998 |
| EP | 938350 B1 | 11/2006 |
| EP | 175277 A2 | 2/2007 |
| EP | 575202 A1 | 10/2009 |
| EP | 1969036 B1 | 3/2011 |
| GB | 545410 A | 5/1942 |
| GB | 2164341 A | 3/1986 |
| GB | 2174403 A | 11/1986 |
| JP | S61-264005 A | 11/1986 |
| JP | 62000502 A | 1/1987 |
| JP | H06-100704 A | 4/1994 |
| JP | H08-283309 A | 10/1996 |
| JP | H11-012306 A | 1/1999 |
| JP | 2003-040902 A | 2/2003 |
| JP | 2003-313366 A | 11/2003 |
| JP | 2006348607 A | 12/2006 |
| JP | 2007-126676 A | 5/2007 |
| JP | 2007224067 A | 9/2007 |
| RU | 2027746 C1 | 1/1995 |
| SU | 15590 A1 | 6/1930 |
| SU | 50447 A1 | 6/1936 |
| SU | 47819 A1 | 7/1936 |
| SU | 47820 A1 | 7/1936 |
| SU | 66332 A1 | 11/1945 |
| SU | 72175 A1 | 11/1947 |
| WO | 1981003255 A1 | 11/1981 |
| WO | 9803255 A1 | 1/1998 |
| WO | 2001010946 A2 | 2/2001 |
| WO | 2001049257 A1 | 7/2001 |
| WO | 2009054595 A1 | 4/2009 |
| WO | 2009095059 A1 | 8/2009 |
| WO | 2009129249 A2 | 10/2009 |
| WO | 2013134429 A1 | 9/2013 |
| WO | 2013134430 A1 | 9/2013 |
| WO | 2013173625 A1 | 11/2013 |
| WO | 2013192182 A1 | 12/2013 |
| WO | 2013192217 A1 | 12/2013 |
| WO | 2013192227 A1 | 12/2013 |
| WO | 2015038707 A1 | 3/2015 |

OTHER PUBLICATIONS

Belmares, H. et al. New Rubber Peptizers and Coatings Derived from Guayule Resin, Industrial and Engineering Chemistry Product Research and Development, vol. 19, pp. 107-111 (1980).

Benedict, H.M. The Effect of Waste Products From the Guayule Rubber Mill on the Growth of Various Crops. Journal of the American Society of Agronomy, vol. 40: pp. 1005-1016 (1948).

Bhowmick, et al. Effect of Resin Components on the Degradation of Guayule Rubber. Journal of Applied Polymer Science, vol. 30, pp. 2367-2388 (dated 1985).

Biosolids Dewatering, Promotional Mateiral, FKC Co. Ltd., accessed Jul. 30, 2015 at http://fkescrewpress.com/docs/fkcbiosolids2.pdf.

Bonner, J., and A.W. Galson. Toxic Substances From the Culture Media of Guayule Whic May Inhibit Growth. Botanical Gazette, vol. 106; pp. 185-198 (1944).

Buranov, Anvar U., et al., Extraction and Characterization of Latex and Natural Rubber from Rubber-Bearing Plants, J. Agric. Food Chem. 2010, 58, 734-743.

Buranov, Anvar, et al., "Rubber-Bearing Plants of Central Asia," Conf. Title Industrial Crops and Rural Development, Conf. date Sep. 17, 2005.

Cataldo, F. Guayule Rubber: A New Possible World Scenario for the Production of Natural Rubber Progress in Rubber and Plastics Technology, vol. 16, No. 1 (dated 2000).

Centrifugation and Centrifuges, Lenntech, accessed Dec. 6, 2011 at http://www.lenntech.com/library/clarification/centrifugation.htm.

Chang, M., and G.T. Tsao. Hydrolysis of Guayule Cellulose for Alchohol Production. E.C. Gregg, J.L. Tipton and H.T. Huang, ends., Proceedings of the Third International Guayule Conference, Pasadena, Clif., Guayule Rubber Soc.: Riverside, Calif., pp. 211-224 (1983).

Crown Model IV and Model V Extractors, Flyer, Crown Iron Works Company, accessed Jul. 30, 2015 at http://www.crowniron.com/userfiles/image/specialty%20extractor%20insert1.pdf (dated Nov. 2006).

Curtis, Jr., "Distribution of Rubber and Resins in Guayule", Plance Physiology, vol. 22, No. 4, pp. 333-359 (dated Oct. 1947).

Decanters from GEA Westfalia Separator, Mechanical Separation, GE Westfalia Separator, www.westfalia-separator.com (2010).

Doering, "Guayule Rubber in Tires and Tubes, Service Tests in Which the Rubber was Exclusively Guayule"Industrial and EngineeringChemistry, vol. 26, No. 5, pp. 541-543. (dated May 1934).

Extraction Decanters from GEA Westfalia Separator, GEA Westfalia Separator Group, accessed May 30, 2012 at http://www.westfalia-separator.com/products/decanters/extraction-decanters.html.

Gelling, I.R. Modification of Natural Rubber Latex With Peracetic Acid. Rubber Chemistry and Technology, vol. 58, pp. 86-96. (1985).

Himayah H. Naovi and George P. Hanson; American Journal of Botany, vol. 69, No. 6 (Jul. 1982) pp. 985-989; Germination and Growth Inhibitors in Guayule (*Parthenium argentatum* Gray) Chaff and Their Possible Influence in Seed Dormancy.

Jordi Labs, printout from http://lifescience.ca/DAT/CATALOGUE/211~v~Polymer_Solubility_Index.pdf, printed Aug. 5, 2014.

Keller, B.A., editor, Rubber and Rubber-Plants (book), pp. 408-410, published 1936.

Keller, R.W., D.S. Winkler, and H.L. Stephens. Degradative Effects of Guayule Resin on Natural Rubber. Rubber Chemistry and Technology. vol. 54, pp. 115-123, (1981).

King, R.J., and D.M. Mondimore. HPLC Procedure for the determination of Free Sulfur in Natural Rubber Formulations, Rubber Chemistry and Technology. vol. 60, pp. 716-720 (1987).

Kuester, J.L., C.M. Fernandez, T.C. Wang, and G. Heath. Liquid Hydrocarbon Fuel Potential of Agricultural Materials. In R.P. Overend, T.A. Milne, and L.K. Mudge. eds., International Conference on Fundamentals of Thermochemical Biomass Conversion, 1982. Estes Park Colo., Elsevier Applied Science: London, pp. 875-895 (1985).

Kuester, J.L., Liquid Hydrocarbon Fuels From Biomass (1981).

(56) References Cited

OTHER PUBLICATIONS

Makitra, et al., "Dependence of Natural Rubber Swelling Index Upon Organic Solvents Properties", Chemistry & Chemical Technology, vol. 5, No. 1 pp. 19-24 (dated 2011).
McIntyre, et al., "Guayule Rubber,"Handbook of Elastomers, pp. 1-27 (dated 2001).
Meeker, T.R.; Specialty Isoprene Based Polymers—Derivatives From the General Purpose Polymers; Doc. 1848; Spring 1985.
Murphy, J. Brad and C.A. Stutte; Analyitical Biochemistry 86, 220-228 (1978); Analysis for Substituted Benzoic and Cinnamic Acids Using High-Pressure Liquid Chromatography.
Presentation pages by Schloman, W.W., Jr. undated (submitted via third party observations in PCT/US2013/041422 on Aug. 6, 2014).
Reynolds, Cynthia, "The Russians Are Coming," www2.macleans.ca/2011/08/11/the-russians-are-coming, Aug. 11, 2011.
Rubber Developments vol. 39 No. 1, pp. 23-24; Your Questions Answered (1986).
Rysselberge, Jacques Van, Utilisation De Bitumes Elastomeres (1976).
Schloman, W. W. Jr., et al., Seasonal Effects on Guayule Resin Composition, J. Agricultrual and Food Chemistry, vol. 34, pp. 177-179 (1986).
Schloman, W.W. Jr. et al., Rubber Additives Derived from Guayule Resin, Industrial and Eng'r Chem. Reasearch, vol. 27, pp. 712-716 (1988).
Schloman, W.W. Jr., et al., Guayule Byproduct Evaluation: Extract Characterization, J. Agricultural and Food Chemistry, vol. 31 pp. 873-876 (1983).
Schloman, W.W. Jr., et al., Water Stress and Seasonal Effects on Rubber Quality in irrigated Guayule, J. Agricultural and Food Chemistry vol. 34, pp. 683-685 (1986).
Schloman, W.W., Jr., "Processing Guayule for Latex and Bulk Rubber." Industrial Crops and Products, vol. 22 No. 1, pp. 41-47, 2005.
Screw Press Operating Hints (CC series), Vincent Corporation, accessed May 31, 2012 at http://www.vincentcorp.com/screw_press_operating_hints_%28cp%20series%29 (dated Mar. 26, 2009).
Screw press, Wikipedia, accessed May 28, 2012 at http://wikipedia.org/wiki/screw_press.
Sin Siew Weng, Some Traditional and New Uses of Skim Rubber, Rubber Research Institute of Malaysia, Procreedings of RRIM Planters Conference (1981).
Stillage Dewatering Screw Press, Promotional Material, FKC Co., Ltd, accessed Jul. 30, 2015 at http://www.fkscrewpress.com/docs/spentgrain_stillageflyerweb.pdf.
Subramaniam, A., J. Rubb. Res. Inst. Malaysia 25(2), 61-68; estimation of Aldehyde Groups in Natural Rubber with 2, 4-dinitrophenylhydrazine (1977).
Tanaka, Y. Structural Characterization of Natural Polyisoprenes: Solve the Mystery of Natural Rubber Based on Structural Study Rubber Chemistry and Technology vol. 74, 355 (dated 2001).
Touzinsky, G.F.; Northern Regional Research Center: Agricultural Research, Science and Education Administration: Guayule As A Source of papermaking Fiber, 5th International Dissolving Pulps Conference, Vienna, pp. 311-315 (1980).
Van Beillen, Jan B, et al., "Guayule and russian dandelion as alternative sources of natural rubber," CRC Critical Reviews in Biotechnology, CRC Press, vol. 27, No. 1, Jan. 2007, pp. 217-231.
Vincent Corporation, Screw Press Operating Hints. Sep. 17, 2009.
Agricultural Encyclopedia of China (Volume of Crops), vol. one, compiled by Editorial Dept. form Agricultural Encyclopedia of China, pp. 719-720, China Agricultural Press, Apr. 1991.
Australian Patent Exam Report for 2009236328 dated Jul. 2, 2013.
Second Australian Patent Exam Report 2009236328 dated Jan. 30, 2014.
Response to Australian Office Action, (dated Dec. 23, 2013).
First Office Action in Chinese Application No. 2009801224454 (dated Mar. 27, 2012).
Second Office Action in Chinese Application No. 2009801224454 (dated Jun. 27, 2012).
EP 09733501 Communication Pursuant to Article 94(3) EPC, (dated May 10, 2012).
Extended Search Report, EP 09733501 (dated Aug. 19, 2011).
Response to the Extended European Search Report dated Mar. 8, 2012.
Response to European Office Action dated Sep. 20, 2012.
Communication pursuant to Article 94(3) EPC dated Jan. 15, 2013.
Invitation pursuant to Article 94 (3) and Rule 71(1) EPC dated Feb. 8, 2013.
Response to EPO dated Apr. 9, 2013.
Notification of Intent to Grant from European Patent Office dated Jun. 12, 2013.
Japanese Office Action for 2011-505140 dated Jan. 7, 2014.
Non-final Office Action issued in U.S. Appl. No. 12/937,284 dated Dec. 11, 2012.
Response filed in U.S. Appl. No. 12/937,284 dated Jun. 13, 2013.
Final Office Action issued in U.S. Appl. No. 12/937,284 dated May 31, 2013.
Response filed in U.S. Appl. No. 12/937,284 dated Oct. 30, 2013.
Non-final Office Action issued in U.S. Appl. No. 12/937,284 dated Nov. 13, 2013.
Response filed in U.S. Appl. No. 12/937,284 dated Mar. 31. 2014.
Notice of allowance issued in U.S. Appl. No. 12/937,284 dated Apr. 16, 2014.
Non-final Office Action issued in U.S. Appl. No. 14/338,581 dated Feb. 3, 2016.
Response filed in U.S. Appl. No. 14/338,581 dated Apr. 19, 2016.
Notice of Allowance issued in U.S. Appl. No. 14/338,581 dated May 2, 2016.
RCE filed on Aug. 2, 2016 in U.S. Appl. No. 14/338,581.
Notice of Allowance issued in U.S. Appl. No. 14/338,561 dated Aug. 30, 2016.
International Preliminary Report on Patentability and Written Opinion (corresponding PCT Appliction No. PCT/US2009/040543); Authorized Officer Athina Nckitas-Etienne; (8 pages)(dated Oct. 19, 2010).
International Search Report (corresponding PCT Application No. PCT/US2009/040543); Authorized Officer Kang, Hyunk Seok; (2 pages) ( dated Nov. 9, 2009).
Examination report issued in application No. AU2013230936 (dated Feb. 26, 2016).
Response filed on May 16, 2016 in application No. AU2013230936).
Response filed on Apr. 22, 2016 in AU application 2013230935.
Examination report issued in application No. AU2013230935 (issued Feb. 25, 2016).
Office Action issued in application No. CN2013-80021313.9 (dated Jun. 2, 2015).
Office Action issued in application No. CN2013-80021313.9 (dated Nov. 3, 2015).
Office Action issued in application No. CN201380021313.9 (dated Jan. 18, 2016).
Third Office Action dated May 2016 in CN application 201380023740.0.
Office Action issued in application No. CN201380023740.0 (dated May 26, 2015).
Office Action issued in application No. CN2013-80023740.0 (dated Dec. 16, 2015).
Supplemental European Search Report in EP national stage (EP13758291.2) from PCT/US2013/02951, dated Oct. 26, 2015.
Response submitted in application No. EP13758291.2 (filed Apr. 14, 2016).
Supplemental European Search Report in EP national stage (EP13757665.8) from PCT/US2013/029449), dated Oct. 26, 2015.
Response submitted in application No. EP13757665.8 (filed Apr. 14, 2016).
Office action dated May 4, 2015 in U.S. Appl. No. 14/383,379.
Response filed Jul. 31, 2015 in U.S. Appl. No. 14/383,379.
Notice of Allowance dated Aug. 19, 2015 in U.S. Appl. No. 14/383,379.

(56) References Cited

OTHER PUBLICATIONS

Notice of allowanced dated Feb. 29, 2016 in U.S. Appl. No. 14/383,379.
Response dated Jul. 7, 2016 in U.S. Appl. No. 14/383,380.
Final Office Action dated Jul. 21, 2016 in U.S. Appl. No. 14/383,380.
Office action dated Apr. 12, 2016 in U.S. Appl. No. 14/383,380.
Response dated Sep. 1, 2016 in U.S. Appl. No. 14/383,380.
Office action dated Jul. 29, 2016 in U.S. Appl. No. 15/130,050.
Response filed Oct. 13, 2016 in U.S. Appl. No. 15/130,050.
Notice of allowance dated Nov. 21, 2016 in U.S. Appl. No. 15/130,050.
International Preliminary Report on Patentability and Written Opinion (PCT Application No. PCT/US2013/029451), dated Sep. 2, 2014.
Search Report from PCT/US2014/029451, dated Jun. 21, 2013.
International Preliminary Report on Patentability and Written Opinion (PCT Application No. PCT/US2013/029449), dated Sep. 22, 2014.
Search Report from PCT/US2014/029449, dated Jun. 21, 2013.
Examination report dated Mar. 2016 in AU application 2013262725.
Response filed in AU application 2013262725 (dated Aug. 10, 2016).
Second examination report dated Aug. 23, 2016 in AU application 2013262725.
Response filed in AU application 2013262725 (dated Sep. 12, 2016).
Allowance dated Sep. 23, 2016 in AU application 2013262725.
First Office Action in Chinese application 201380031854.X (dated Sep. 11, 2015).
Second Office Action dated in CN application 201380031854.X, (dated May 13, 2016).
Supplemental Search Report and opinion dated May 2016 in application EP 13792144.0.
Response filed in application EP13792144.0 dated Aug. 30, 2016.
International Preliminary Report on Patentability and Written Opinion from PCT/US2013/041422, dated Nov. 18, 2014.
Search Report from PCT/US2013/041422, dated Nov. 21, 2013.
Third party observations submitted in PCT/US2013/041422 dated Nov. 21, 2014.
Examination report dated May 2016 in AU application 2013277296.
Response filed Jul. 1, 2016 in AU application 2013277296.
Allowance dated Aug. 2016 in AU application 2013277296.
Supplemental Search Report and opinion dated Feb. 2016 in EP application 12807874.2.
Response dated Jul. 12, 2016 in EP application 12807874.2.
Notice of allowance dated May 2016 in U.S. Appl. No. 14/409,132.
Notice of allowance dated Nov. 2016 in U.S. Appl. No. 14/409,132.
Examination report dated May 2, 2016 in AU application 2013277335.
Response dated Jul. 1, 2015 in AU application 2013277335.
Allowance dated Aug. 2016 in AU application 2013277335.
Office Action issued in application No. CN2013-80032039.5 (dated Sep. 1, 2015).
Second Office Action dated May 2016 in CN application 201380032039.5.
Third Office Action dated Nov. 2016 in CN application 201380032039.5.
Supplemental Search Report and opinion dated Feb. 2016 in EP application 12806430.8.
Response filed Jun. 23, 2016 in EP application 12806430.8.
Search Report from PCT/US13/46328, dated Oct. 11, 2013.
International Preliminary Report on Patentability and Written Opinion from PCT/US13/46328, dated Dec. 23, 2014.
Examination Report dated Feb. 2016 in AU application 2013277286.
Response filed May 2016 in AU application 2013277286.
Allowance dated Jun. 2016 in AU application 2013277286.
Office Action issued in application No. CN2013-80032056.9 (dated Sep. 6, 2015).
Second Office Action dated May 2016 in CN application 201380032056.9.
Third Office Action issued in application No. CN2013-80032056.9 (dated Nov. 2016).
Supplemental Search Report and opinion dated Feb. 2016 in EP application 13807611.2.
Response filed May 19, 2016 in EP application 12807611.2.
Grant notice dated Sep. 2016 in EP application 12607611.2.
Search Report from PCT/US13/46380, dated Oct. 9, 2013.
International Preliminary Report on Patentability and Written Opinion from PCT/US13/46380, dated Dec. 23, 2013.
Office Action from U.S. Appl. No. 14/483,455, dated Apr. 27, 2016.
Response filed in U.S. Appl. No. 14/483,455 dated Aug. 26, 2016.
Final Office Action from U.S. Appl. No. 14/483,455, dated Sep. 16, 2016.
Response filed in U.S. Appl. No. 14/483,455 dated Sep. 22, 2016.
Notice of Allowance issued in U.S. Appl. No. 14/483,455 dated Sep. 29, 2016.
International Search Report with Written Opinion from PCT Application No. PCT/US2014/055086, dated Feb. 5, 2015.
Third Office Action issued in CN application 201380031854.X. (dated Dec. 6, 2016).
Kim, Dong Seok, International Search Report with Written Opinion from PCT/US2013/041422, 13 pp. (dated Aug. 5, 2013).
Notice of allowance from U.S. Appl. No. 14/383,380, dated Dec. 27, 2016.
Notice of allowance from U.S. Appl. No. 15/477,152, dated Oct. 6, 2017.
Supplemental search report from EP application 16205645, dated May 11, 2017.
Examination report from AU application 2016-222428, dated Jan. 2017.
Response filed in AU application 2016-222428 dated Aug. 2017.
Office action issued in RU application 2014140181 dated Feb. 14, 2017.
Supplemental search report issued in EP application 17168837.7 dated Jun. 2017.
Fourth office action issued in CN application 201380023740.0 dated Oct. 2016.
Decision of rejection issued in CN application 201380023740.0 dated Mar. 2017.
Examination report issued in AU application 2016213719 dated Jan. 2017.
Office action issued in RU application 2014140183 dated Feb. 2017.
Office action issued in CN application 201380031854.X dated Dec. 6, 2016.
Examination report issued in AU application 2017200069 dated Aug. 2017.
Office action issued in RU application 2014150798 dated Apr. 5, 2017.
International Preliminary Report on Patentability and Written Opinion from PCT/US2013/046409, dated Dec. 23, 20144.
Search Report from PCT/US2013/046409, dated Oct. 15, 2013.
First office action issued in CN application 201380032071.3 dated Feb. 7, 2017.
Second office action issued in CN application 201380032071.3 dated Aug. 29, 2017.
Office action issued in RU application 2015101234, dated Mar. 29, 2017.
Examination report issued in AU application 2016235014, dated Jun. 2017.
Office action issued in RU application 2015101287, dated Apr. 7, 2017.
Response filed in AU application 2016213719 dated Mar. 2017.
Search report from EP application 17152493.7 dated May 2017.

COMPOSITIONS CONTAINING PURIFIED NON-HEVEA RUBBER AND RELATED PURIFICATION METHODS

CROSS-REFERENCE TO RELATED APPLICATION

This application claims priority to and any other benefit of U.S. Provisional Patent Application Ser. No. 61/647,778, filed May 16, 2012, and entitled "COMPOSITIONS CONTAINING PURIFIED NON-*HEVEA* RUBBER AND RELATED PURIFICATION METHODS," the entire disclosure of which is incorporated by reference herein;

BACKGROUND

The *Hevea* plant or tree (also called *Hevea brasiliensis* or a rubber tree) is a well-known source of natural rubber (also called polyisoprene). Rubber sources such as *Hevea brasiliensis, Ficus elastic* (India rubber tree) and *Cryptostegia grandiflora* (Madagascar rubbervine) produce natural rubber in the form of a sap where the rubber is suspended in an aqueous solution that flows freely and can be recovered by tapping of the plant. Various non-*Hevea* plants are also known to contain natural rubber, but their rubber is stored within the individual cells of the plant (e.g., stems, roots or leaves) and cannot be accessed by tapping but can only be accessed by breaking down the cell walls by physical or other means. Thus, processes for the removal of rubber from non-*Hevea* plants are generally more complicated and entailed than processes for harvesting rubber from *Hevea* trees.

SUMMARY

Provided herein are organic solvent-based processes for the isolation of purified natural rubber from non-*Hevea* plants. The processes are particularly useful with plant matter that comprises at least 90% by weight roots sourced from *Taraxacum kok-saghyz* (Russian dandelion), *Scorzonera tau-saghyz* (Tau-Saghyz), *Scorzonera uzbekistanica*, and combinations thereof. The processes are also useful in further purifying semi-purified non-*Hevea* plant matter (i.e., plant matter that has had a majority of the cellulose-type plant material removed but that still contains some amount of cellulose-type plant material in addition to other impurities along with non-*Hevea* rubber).

Also provided herein is a purified non-*Hevea* rubber product containing 100 phr of rubber sourced from *Taraxacum kok-saghyz, Scorzonera tau-saghyz, Scorzonera uzbekistanica*, and combinations thereof, having a specified purity level. Additionally provided are sulfur-vulcanizable rubber compounds and sulfur-vulcanized rubber compounds that incorporate 10-100 phr of non-*Hevea* rubber sourced from *Taraxacum kok-saghyz, Scorzonera tau-saghyz, Scorzonera uzbekistanica*, and combinations thereof, having a specified purity level. The purified non-*Hevea* rubber product, sulfur-vulcanizable rubber compounds and sulfur-vulcanized rubber compounds all make use of the discovery that up to 3.5% of total impurities can be present in the non-*Hevea* rubber and its use as a total or partial replacement for *Hevea* natural rubber will result in comparable or even improved mechanical properties.

The process for isolating purified natural rubber from non-*Hevea* plant matter comprises providing harvested plant matter comprising at least 90% by weight of roots sourced from *Taraxacum kok-saghyz, Scorzonera tau-saghyz, Scorzonera uzbekistanica*, and combinations thereof. This harvested plant matter is mixed with at least one rubber-soluble organic solvent at a weight ratio of from 2:100 to 20:100 thereby producing a quantity of dissolved rubber and a quantity of solids. The solids represent insoluble cellulose-based plant matter in addition to impurities that are not soluble in the at least one rubber-soluble organic solvent. After mixing, the dissolved rubber is isolated from the solids to produce a dissolved rubber fraction that contains no more than 2% by weight solids based on the total weight of the dissolved rubber fraction. The at least one rubber-soluble solvent is then removed from the dissolved rubber fraction to produce a solid rubber mass. The solid rubber mass is mixed with at least one rubber-insoluble organic solvent at a weight ratio of 2:100 to 20:100 thereby dissolving a quantity of impurities from the solid rubber mass and thereafter the remaining solid rubber mass is isolated from the at least one rubber-insoluble organic solvent to produce a purified natural rubber. The purified natural rubber contains no more than 3.5% by weight total impurities based upon the total weight of the purified natural rubber that is obtained.

The purified non-*Hevea* rubber product provided herein contains 100 phr of rubber sourced from *Taraxacum kok-saghyz, Scorzonera tau-saghyz, Scorzonera uzbekistanica*, and combinations thereof with no more than 3.5% by weight of total impurities (based upon the total weight of the purified non-*Hevea* rubber). Of the no more than 3.5% by weight total impurities, no more than 2% by weight are volatiles, no more than 1% by weight are residues and no more than 0.5% by weight are combustibles. In other words, the purified non-*Hevea* rubber contains up to 2% by weight volatile impurities, up to 1% by weight residue impurities and up to 0.5% by weight combustible impurities. The purified non-*Hevea* rubber may be purified according to the previously-described organic-solvent purification processes or by other methods as long as the impurities content falls within the specified range.

The sulfur-vulcanizable rubber compound provided herein contains 10-100 phr of purified non-*Hevea* natural rubber sourced from *Taraxacum kok-saghyz, Scorzonera tau-saghyz, Scorzonera uzbekistanica*, and combinations thereof wherein said purified non-*Hevea* natural rubber contains no more than 3.5% by weight total impurities with no more than 2% by weight volatiles, no more than 1% by weight residue and no more than 0.5% by weight combustibles; 0-90 phr of at least one synthetic conjugated-diene containing polymer or copolymer; and 20-200 phr of at least one reinforcing filler selected from the group consisting of carbon black, silica, calcium carbonate, clay, talc, barite, wollastonite, mica, precipitated silicates, and diatomite. The purified non-*Hevea* natural rubber that is utilized in the sulfur-vulcanizable rubber compound may be purified according to the previously-described organic-solvent purification processes or by other methods so long as the impurities content falls within the specified range.

The sulfur-vulcanized rubber compound provided herein contains 10-100 phr of purified non-*Hevea* natural rubber sourced from *Taraxacum kok-saghyz, Scorzonera tau-saghyz, Scorzonera uzbekistanica*, and combinations thereof wherein said purified non-*Hevea* natural rubber contains no more than 3.5% by weight total impurities with no more than 2% by weight volatiles, no more than 1% by weight residue and no more than 0.5% by weight combustibles; 0-90 phr of at least one synthetic conjugated-diene containing polymer or copolymer; 20-200 phr of at least one reinforcing filler selected from the group consisting of carbon black, silica, calcium carbonate, clay, talc, barite, wollastonite, mica, precipitated silicates, and diatomite; 0.5-6 phr sulfur; and at least one accelerator. The purified non-*Hevea* natural rubber that is utilized in the sulfur-vulcanized rubber compound may be purified according to the previously-described organic-solvent purification processes or by other methods as long as the impurities content falls within the specified range.

DETAILED DESCRIPTION

The process for isolating purified natural rubber from non-*Hevea* plant matter comprises providing harvested plant matter comprising at least 90% by weight of roots sourced from *Taraxacum kok-saghyz, Scorzonera tau-saghyz, Scorzonera uzbekistanica*, and combinations thereof. This harvested plant matter is mixed with at least one rubber-soluble organic solvent at a weight ratio of from 2:100 to 20:100 thereby producing a quantity of dissolved rubber and a quantity of solids. The solids represent insoluble cellulose-based plant matter in addition to impurities that are not soluble in the at least one rubber-soluble organic solvent. After mixing, the dissolved rubber is isolated from the solids to produce a dissolved rubber fraction that contains no more than 2% by weight solids based on the total weight of the dissolved rubber fraction. The at least one rubber-soluble solvent is then removed from the dissolved rubber fraction to produce a solid rubber mass. The solid rubber mass is mixed with at least one rubber-insoluble organic solvent at a weight ratio of 2:100 to 20:100 thereby dissolving a quantity of impurities from the solid rubber mass and thereafter the remaining solid rubber mass is isolated from the at least one rubber-insoluble organic solvent to produce a purified natural rubber. The purified natural rubber contains no more than 3.5% by weight total impurities based upon the total weight of the purified natural rubber that is obtained.

The purified non-*Hevea* rubber product provided herein contains 100 phr of rubber sourced from *Taraxacum kok-saghyz, Scorzonera tau-saghyz, Scorzonera uzbekistanica*, and combinations thereof with no more than 3.5% by weight of total impurities (based upon the total weight of the purified non-*Hevea* rubber). Of the no more than 3.5% by weight total impurities, no more than 2% by weight are volatiles, no more than 1% by weight are residues and no more than 0.5% by weight are combustibles. In other words, the purified non-*Hevea* rubber contains up to 2% by weight volatile impurities, up to 1% by weight residue impurities and up to 0.5% by weight combustible impurities. The purified non-*Hevea* rubber may be purified according to the previously-described organic-solvent purification processes or by other methods as long as the impurities content falls within the specified range.

The sulfur-vulcanizable rubber compound provided herein contains 10-100 phr of purified non-*Hevea* natural rubber sourced from *Taraxacum kok-saghyz, Scorzonera tau-saghyz, Scorzonera uzbekistanica*, and combinations thereof wherein said purified non-*Hevea* natural rubber contains no more than 3.5% by weight total impurities with no more than 2% by weight volatiles, no more than 1% by weight residue and no more than 0.5% by weight combustibles; 0-90 phr of at least one synthetic conjugated-diene containing polymer or copolymer; and 20-200 phr of at least one reinforcing filler selected from the group consisting of carbon black, silica, calcium carbonate, clay, talc, barite, wollastonite, mica, precipitated silicates, and diatomite. The purified non-*Hevea* natural rubber that is utilized in the sulfur-vulcanizable rubber compound may be purified according to the previously-described organic-solvent purification processes or by other methods so long as the impurities content falls within the specified range.

The sulfur-vulcanized rubber compound provided herein contains 10-100 phr of purified non-*Hevea* natural rubber sourced from *Taraxacum kok-saghyz, Scorzonera tau-saghyz, Scorzonera uzbekistanica*, and combinations thereof wherein said purified non-*Hevea* natural rubber contains no more than 3.5% by weight total impurities with no more than 2% by weight volatiles, no more than 1% by weight residue and no more than 0.5% by weight combustibles; 0-90 phr of at least one synthetic conjugated-diene containing polymer or copolymer; 20-200 phr of at least one reinforcing filler selected from the group consisting of carbon black, silica, calcium carbonate, clay, talc, barite, wollastonite, mica, precipitated silicates, and diatomite; 0.5-6 phr sulfur; and at least one accelerator. The purified non-*Hevea* natural rubber that is utilized in the sulfur-vulcanized rubber compound may be purified according to the previously-described organic-solvent purification processes or by other methods as long as the impurities content falls within the specified range.

Definitions

As used herein, the term "combustibles" or "combustible impurities" means those impurities that will burn-off during a thermogravimetric analysis at a temperature range of 600-750° C.

As used herein, the term "non *Hevea*" or "non-*Hevea* plant" is intended to encompass plants that contain natural rubber within the individual cells of the plant.

As used herein, the term "plant matter" means material obtained from a non-*Hevea* plant.

As used herein, the term "residues" or "residue impurities" means those impurities that will burn during a thermogravimetric analysis at a temperature range of greater than 750° C.; these impurities will remain as ash-like material at the conclusion of the 850° C. heating cycle.

As used herein, the term "rubber-soluble organic solvent" means an organic solvent with a solubility parameter that is similar enough to the solubility parameter of natural rubber that the natural rubber contained within the non-*Hevea* plant matter will be dissolved therein. More specifically, a rubber-soluble solvent will have a solubility parameter of 7.3-9.2 $(cal/cm^3)^{1/2}$. Some rubber-soluble solvents will be non-polar organic solvents.

As used herein, the term "rubber-insoluble organic solvent" means an organic solvent with a solubility parameter that is dissimilar enough to the solubility parameter of natural rubber that the natural rubber from the non-*Hevea* plant matter will not dissolve therein. More specifically, a rubber-insoluble solvent will have a solubility parameter of 9.3-24 $(cal/cm^3)^{1/2}$. Some rubber-insoluble solvents will be polar organic solvents.

As used herein, the term "total impurities" means the sum of volatiles, combustibles and residues.

As used herein, the term "volatiles" or "volatile impurities" means those impurities that will burn-off during a thermogravimetric analysis at a temperature of less than 250/275° C.; such impurities include substances like resins, terpenes and low-mass organics.

Processes

In certain embodiments, the processes disclosed herein yield a purified natural rubber that contains no more than 3% by weight total impurities. In other embodiments, the processes disclosed herein yield a purified natural rubber that contains no more than 2.5% by weight total impurities.

As previously discussed, according to the processes disclosed herein, the harvested plant matter is mixed with the at least one rubber-soluble organic solvent at a weight to volume ratio of 2:100 to 20:100. In other words, 2 grams of harvested plant matter to 100 mL of total rubber-soluble organic solvent and 20 grams of harvested plant matter to 100 mL of total rubber-soluble organic solvent. These ratios can also be represented as weight to volume ratios of 1:50 to 10:50. In certain embodiments, the harvested plant matter is mixed with the at least one rubber-soluble organic solvent at a weight to volume ratio of 3:100 to 10:100. In other words, 3 grams of harvested plant matter to 100 mL of total rubber-soluble organic solvent and 10 grams of harvested plant matter to 100 mL of total rubber-soluble organic solvent. The relative amounts of harvested plant matter and total rubber-soluble solvent that are utilized in a particular process can be dependent upon the amount of mixing that may be applied to the mixture of harvested plant matter and at least one rubber-soluble organic solvent, the affinity of the solvent(s) for natural rubber and the amount of time that the mixture is allowed to remain in contact prior to isolating the dissolved rubber from the solids.

In certain embodiments of the processes disclosed herein, the at least one rubber-soluble organic solvent comprises one or more rubber-soluble organic solvents.

In certain embodiments of the processes disclosed herein, when the harvested plant matter and at least one rubber-soluble solvent are mixed together, it can be advantageous to apply some type of agitation to the mixture in order to assist in dissolution of the rubber from the plant matter. Various types of agitation can be utilized including continuous or intermittent mixing using various types of apparatus, including, but not limited to, magnetic stir bars, propellers, baffles, sonication and the like.

According to the processes disclosed herein, the mixture of harvested plant matter and at least one rubber-soluble organic solvent are allowed to remain in contact for various amounts of time, as may be required to dissolve the desired amount of rubber from the harvest plant matter. The actual amount of time that the mixture is allowed to remain in contact can be influenced by various factors including the presence and amount of agitation and the relative amounts of harvested plant matter and solvent. In certain embodiments of the processes disclosed herein, the mixture of harvested plant matter and at least one rubber soluble organic solvent are allowed to remain in contact for 4-24 hours. In other embodiments of the processes disclosed herein, a shorter contact time such as 30 minutes up to 12 hours or even 30 minutes to 6 hours may be achieved based upon use of a solvent or solvents that exhibit particular affinity for natural rubber, agitation and/or relatively more solvent(s). In preferred embodiments of the processes disclosed herein, the mixture of harvested plant matter and at least one rubber-soluble organic solvent are allowed to remain in contact for 6-12 hours.

According to the processes disclosed herein, after the mixture of harvested plant matter and at least one rubber-soluble organic solvent have been allowed to remain in contact for a sufficient amount of time to dissolve the desired amount of rubber, the at least one rubber-soluble solvent is removed from the dissolved rubber fraction to produce a solid rubber mass that contains no more than 2% by weight solids based upon the total weight of the dissolved rubber fraction. In other embodiments, the solid rubber mass contains no more than 1% by weight solids based upon the total weight of the dissolved rubber fraction. Solids refers to all material that is not soluble in the at least one non-soluble organic solvent and may include cellulose, dirt, ash and other plant material. Various methods may be utilized to separate the dissolved rubber fraction from the solids. These methods include, but are not limited to flotation, filtering and centrifuging. In preferred embodiments of the processes disclosed herein, the dissolved rubber fraction is removed from the solids using a centrifuging process.

As previously discussed, the at least one rubber-soluble solvent is removed from the dissolved rubber fraction to produce a solid rubber mass. The removal of the at least one rubber-soluble solvent may be effected using various types of apparatus, including, but not limited to evaporating of solvent under vacuum, evaporating of solvent by mild heating, by causing coagulation of the rubber based upon addition of other solvents, and coagulation by freezing. The term solid rubber mass should be understood to include both solid and semi-solid rubber masses, that contain some small amount of residual solvent (e.g., up to 5% by weight, preferably 2% by weight or less, based upon the total weight of the solid rubber mass).

As previously discussed, the processes disclosed herein make use of at least one rubber-insoluble organic solvent that is mixed with the solid rubber mass in order to dissolve soluble impurities and remove them from the solid rubber mass. The solid rubber mass is mixed with the at least one rubber-insoluble organic solvent at a weight to volume ratio of 2:100 to 20:100. In other words, 2 grams of solid rubber mass to 100 mL of total rubber-insoluble organic solvent and 20 grams of solid rubber mass to 100 mL of total rubber-insoluble organic solvent. These ratios can also be represented as weight to volume ratios of 1:50 to 1:5. In certain embodiments, the solid rubber mass is mixed with the at least one rubber-insoluble organic solvent at a weight to volume ratio of 5:100 to 10:100. In other words, 5 grams of harvested plant matter to 100 mL of total rubber-insoluble organic solvent and 10 grams of harvested plant matter to 100 mL of total rubber-insoluble organic solvent. The relative amounts of harvested plant matter and total rubber-insoluble solvent that are utilized in a particular embodiment of the processes disclosed herein can be dependent upon the amount of mixing that may be applied to the mixture of solid rubber mass and at least one rubber-insoluble organic solvent as well as the amount of time that the mixture is allowed to remain in contact prior to isolating the reduced solid rubber mass from the at least one rubber-insoluble organic solvent.

In certain embodiments of the processes disclosed herein, the at least one rubber-insoluble organic solvent comprises one or more rubber-insoluble organic solvents.

In certain embodiments of the processes disclosed herein, when the solid rubber mass and at least one rubber-insoluble organic solvent are mixed together, it can be advantageous to apply some type of agitation to the mixture in order to increase assist in dissolution of the rubber from the plant matter. Various types of agitation can be utilized including continuous or intermittent mixing using various types of apparatus, including, but not limited to, magnetic stir bars, propellers, baffles, sonication and the like.

According to the processes disclosed herein, the mixture of solid rubber mass and at least one rubber-insoluble organic solvent are allowed to remain in contact for various amounts of time, as may be required to dissolve the desired amount of soluble impurities from the solid rubber mass. The actual amount of time that the mixture is allowed to remain in contact can be influenced by various factors including the presence and amount of agitation and the relative amounts of solid rubber mass and solvent. In certain embodiments of the processes disclosed herein, the mixture of solid rubber mass and at least one rubber-insoluble organic solvent are allowed to remain in contact for 8-12 hours. In other embodiments of the processes disclosed herein, a shorter contact time such as 30 minutes up to 12 hours or even 30 minutes to 6 hours may be achieved based upon use of a solvent or solvents that exhibit particular affinity for natural rubber, agitation and/or relatively more solvent(s). In preferred embodiments of the processes disclosed herein, the mixture of harvested plant matter and at least one rubber-insoluble organic solvent are allowed to remain in contact for 4-6 hours.

As previously discussed, the processes disclosed herein make use of non-*Hevea* plant matter comprising at least 90% by weight of roots that are sourced from *Taraxacum kok-saghyz, Scorzonera tau-saghyz, Scorzonera uzbekistanica*, and combinations thereof. In other words, the harvested plant matter contains 10% or less of plant matter from sources other than the roots of *Taraxacum kok-saghyz, Scorzonera tau-saghyz* and *Scorzonera uzbekistanicai* plant (or combinations thereof). This other matter may include crowns from the same plant sources. The plant matter that is utilized may take various physical forms as described further herein. In certain embodiments, the plant matter comprises chopped roots from *Taraxacum kok-saghyz, Scorzonera tau-saghyz, Scorzonera uzbekistanica*, and combinations thereof. In certain embodiments, the plant matter also includes crown material in addition to root material, all of which has been mechanically reduced in size. In preferred embodiments, all or almost all (i.e., 98% by weight or more or even 99% by weight or more of the dirt) of the residual dirt that may have been attached to the roots has been removed. Various methods for removing the dirt may be utilized including one or more of water washing, shaking, forced air and vacuum. When any type of water washing is used to remove dirt, it is preferably followed by drying of the roots to remove residual water.

In certain embodiments, the plant matter has been chopped into pieces. The chipping or chopping make take place in one or more than one step. Rough chopping may take place before or after the optional removal of leaves and soil (such as by shaking the plant or subjecting it to strong air currents), but is preferably after the removal of a large majority of leaves and soil from the harvested plant matter. Chipping or chopping into pieces with an average size of 1.5" or less or 1" or less may be achieved using various physical means. One exemplary way of obtaining chopped plant matter with an average size of 1.5" or less or 1" or less is to feed raw plant material (or optionally rough chopped plant matter) into a shredder, a granulator, a hammer mill or a roller mill. A granulator is a well-known machine designed for chopping or grinding material into various sizes. Most granulators contain multiple knives (often steel knives) and one or more screens (sometimes interchangeable) with various diameter holes to determine the size of the final product. Various size granulators exist and may be useful in chopping the plant matter such as those containing openings of ⅜", ¼" and ⅛". A hammer mill can generally be described as a steel drum containing a vertical or horizontal rotating shaft or drum on which hammers are mounted; the hammers "pound" the material that is passed through the mill. Various size hammer mills exist and may be useful in chopping the plant matter such as those containing openings of ⅜", ¼" and ⅛". A roller mill/cracker mill can generally be described as a device with two or more rolls each containing longitudinal grooves which assist in further size reduction of material fed through the mill. Various size roller mills exist and may be useful in chopping the plant matter such as those containing openings of ⅜", ¼" and ⅛". In certain embodiments according to the processes disclosed herein, the plant matter is subjected to at least one of a shredder, a granulator, a hammer mill, a roller mill and a flaker mill to produce chopped plant matter having an average size of 1" or less". In other embodiments according to the processes disclosed herein, the plant matter is subjected to at least two of a shredder, a granulator, a hammer mill, a roller mill and a flaker mill to produce chopped plant matter having an average size of 1" or less.

In certain embodiments of the processes disclosed herein, the plant matter has not only been chopped or shredded (such as by treatment in a shredder, roller mill, hammer mill and/or granulator) but has also been subjected to a flaker mill/flaker and/or other mechanical treatment capable of rupturing the cell walls of the cells that contain the natural rubber. A flaker mill or flaker can generally be described as a device with two or more rolls each having a smooth surface, usually operated at different speeds, with a defined and adjustable clearance between rolls which primarily assist in providing further rupturing of plant cell walls. Such types of mechanical treatment tend to increase the amount of natural rubber that can ultimately be recovered from the plant matter. In certain embodiments of the processes disclosed herein, chopped plant matter is subjected to both roll milling and flake milling. In those embodiments where at least one of roll milling, or hammer milling, a shredder, a granulator and flake milling is used upon the chopped plant matter, the chopped plant matter is preferably treated with at least one antioxidant (the amount of the antioxidant being in accordance with the antioxidant discussion herein).

In certain preferred embodiments of the processes disclosed herein, the plant matter that is subjected to the organic-based purification process in order to isolate purified natural rubber has been semi-purified in order to remove a majority of the cellulose-type plant material. Such semi-purified plant material will still contain some amount of cellulose-type plant material in addition to other impurities along with non-*Hevea* rubber. In certain embodiments, at least 50% by weight of the cellulose-type plant material has been removed to form the semi-purified plant material. In other embodiments, at least 75% or even at least 80% of the cellulose-type plant material has been removed to form the semi-purified plant material.

In certain preferred embodiments of the processes disclosed herein, the harvested plant matter comprises at least 90% by weight of roots sourced from *Taraxacum kok-saghyz*. It should be understood that when the weight percentage of plant matter is specified that it is intended to include any residual dirt or other matter associated with the plant matter that is added along with the plant matter to the solvent. In other preferred embodiments of the processes disclosed herein, the harvested plant matter comprises at least 95% by weight of roots sourced from *Taraxacum kok-saghyz*.

In any of the foregoing embodiments of the processes described herein, the at least one rubber-soluble organic solvent may comprise non-polar organic solvent. Suitable non-polar organic solvents may be selected from the group consisting of alkanes having from 4 to 9 carbon atoms (e.g., pentane, hexane, heptanes, nonane and the like); cycloalkanes and alkyl cycloalkanes having from 5 to 10 carbon atoms (e.g., cyclohexane, cyclopentane and the like); aromatics and alkyl substituted aromatics having from 6 to 12 carbon atoms (e.g., benzene, toluene, xylene and the like); and combinations thereof. In certain preferred embodiments of the processes disclosed herein, the at least rubber-soluble solvent or the at least one non-polar organic solvent is toluene. In any of the embodiments of the processes disclosed herein, mixtures of two or more non-polar organic solvents may be utilized.

In any of the foregoing embodiments of the processes disclosed herein, the at least one rubber-insoluble organic solvent may comprise polar organic solvent. Suitable polar organic solvents may be selected from the group consisting of alcohols having 1 to 8 carbon atoms (e.g., ethanol, isopropanol, ethanol and the like); ethers and esters having from 2 to 8 carbon atoms; cyclic ethers having from 4 to 8 carbon atoms; and ketones having from 3 to 8 carbon atoms (e.g., acetone, methyl ethyl ketone and the like); and combinations thereof. In certain preferred embodiments of the processes disclosed herein, the at least one rubber-insoluble organic solvent or at least one polar organic solvent is acetone. In any of the embodiments of the processes disclosed herein, mixtures of two or more polar organic solvents may be utilized.

Purified Non-*Hevea* Rubber Product

As previously discussed, the non-*Hevea* rubber that is present at 100 phr in the purified non-*Hevea* rubber product contains non-*Hevea* rubber containing no more than 3.5% by weight total impurities.

In certain embodiments, the non-*Hevea* rubber that is present at 100 phr in the purified non-*Hevea* rubber product contains no more than 3% by weight total impurities. In other embodiments, the purified non-*Hevea* rubber that is present at 100 phr in the purified non-*Hevea* rubber product contains no more than 2.5% by weight total impurities.

It is contemplated that the purified non-*Hevea* rubber product (whether containing no more than 3.5% by weight total impurities, no more than 3% by weight total impurities or no more than 2.5% by weight total impurities) may be sold in a pure form (i.e., with no additional additives). It is also contemplated that it may be formulated with one or more other rubbers or rubber additives and sold in such a formulated form. In certain embodiments, the one or more rubbers may be selected from the group consisting of *Hevea*-natural rubber, synthetic conjugated-diene containing polymers and copolymers. Non-limiting examples of such rubbers include, but are not limited to, polybutadiene, polyisoprene, and styrene-butadiene copolymer. The rubber additives may be selected from one or more of conventional rubber additives. Examples include, but are not limited to, fillers, process oils, plasticizers, antidegradants (e.g., antioxidants and antioxonants), curing agents and the like.

Sulfur-Vulcanizable Rubber Compound

As previously discussed, the sulfur-vulcanizable rubber compound contains 10-100 phr of non-*Hevea* rubber sourced from *Taraxacum kok-saghyz, Scorzonera tau-saghyz, Scorzonera uzbekistanica*, and combinations that contains no more than 3.5% by weight total impurities, with no more than 2% by weight volatiles, no more than 1% by weight residue and no more than 0.5% by weight combustibles.

In certain embodiments of the sulfur-vulcanizable rubber compound, the non-*Hevea* rubber sourced from *Taraxacum kok-saghyz, Scorzonera tau-saghyz, Scorzonera uzbekistanica*, and combinations thereof utilizes purified rubber that contains no more than 3% by weight total impurities. In other embodiments of the sulfur-vulcanizable rubber compound, the rubber sourced from *Taraxacum kok-saghyz, Scorzonera tau-saghyz, Scorzonera uzbekistanica*, and combinations thereof utilizes purified rubber that contains no more than 2.5% by weight total impurities.

In certain preferred embodiments of the sulfur-vulcanizable rubber compound, the rubber is sourced from *Taraxacum kok-saghyz*. In certain of these embodiments, the source is plant matter that comprises at least 90% or at least 95% by weight roots from *Taraxacum kok-saghyz*.

As previously discussed, the sulfur-vulcanizable rubber compound contains 0-90 phr of at least one synthetic conjugated-diene containing polymer or copolymer. In certain embodiments, the sulfur-vulcanizable rubber compound contains 10-90 phr of at least one synthetic conjugated-diene containing polymer or copolymer. In yet other embodiments, the sulfur-vulcanizable rubber compound contains 40-90 phr of at least one synthetic conjugated-diene containing polymer or copolymer. Non-limiting examples of the synthetic conjugated diene containing polymer or copolymer include polybutadiene, polyisoprene and styrene-butadiene copolymer. In certain embodiments, the sulfur-vulcanizable compound contains 0-90 phr of *Hevea*-natural rubber. In other embodiments, the sulfur-vulcanizable compound contains 10-60 phr of *Hevea*-natural rubber. In certain embodiments, the 0-90 phr of *Hevea* natural rubber together with the rubber sourced from *Taraxacum kok-saghyz, Scorzonera tau-saghyz, Scorzonera uzbekistanica*, and combinations thereof, comprises 100 phr of the sulfur-vulcanizable rubber compound; in some such embodiments the non-*Hevea* rubber may be viewed as a partial replacement for *Hevea* rubber. Alternatively, in other embodiments, the sulfur-vulcanizable rubber compound may comprise 10-100 phr of purified rubber sourced from *Taraxacum kok-saghyz, Scorzonera tau-saghyz, Scorzonera uzbekistanica*, and combinations thereof (with a no more than 3% by weight total impurities, or no more than 2.5% by weight total impurities); 0-90 phr of at least one synthetic conjugated-diene containing polymer or copolymer; and 0-90 phr of at *Hevea* natural rubber.

As previously discussed, the sulfur-vulcanizable rubber compound contains 20-200 phr of at least one reinforcing filler selected from the group consisting of carbon black, silica, calcium carbonate, clay, talc, barite, wollastonite, mica, precipitated silicates, and diatomite. Various combinations of reinforcing fillers may be utilized. In preferred embodiments, the sulfur-vulcanizable rubber compound contains at least one of silica and carbon black. In preferred embodiments, the at least one reinforcing filler is present in an amount of 5-100 phr.

The silica utilized (silicon dioxide) may include wet-process, hydrated silica produced by a chemical reaction in water, and precipitated as ultra-fine spherical particles. In certain of the foregoing embodiments, the silica has a surface area of about 32 to about 400 $m^2/g$, in another embodiment about 100 to about 250 $m^2/g$, and in yet another embodiment, about 150 to about 220 $m^2/g$. The pH of the silica filler in certain of the foregoing embodiments is about 5.5 to about 7 and in another embodiment about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™ 1165MP and 175GRPlus (Rhodia), Vulkasil™ (Bary AG), Ultrasil™ VN2, VN3 (Degussa), and HuberSil™ 8745 (Huber).

If silica is used as a filler, it may be desirable to use a coupling agent to couple the silica to the polymer. Numerous coupling agents are known, including but not limited to organosulfide polysulfides and organoalkoxymercaptosilanes. Generally, any organosilane polysulfide may be used. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricycloneoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxyethoxypropoxysilyl 3'-diethoxybutoxy-silylpropyl tetrasulfide, 2,2'-bis(dimethylmethoxysilylethyl)disulfide, 2,2'-bis(dimethylsecbutoxysilylethyl)trisulfide, 3,3'-bis(methylbutylethoxysilylpropyl)tetrasulfide, 3,3'-bis(di t-butylmethoxysilylpropyl)tetrasulfide, 2,2'-bis(phenylmethylmethoxysilylethyl)trisulfide, 3,3'-bis(diphenyl isopropoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methylethoxypropoxysilylethyl)tetrasulfide, 3,3'-bis(diethylmethoxysilylpropyl)tetrasulfide, 3,3'-bis(ethyldi-secbutoxysilylpropyl)disulfide, 3,3'-bis(propyldiethoxysilylpropyl)disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide and 3,3'-bis(dimethoxyphenylsilyl-2-methylpropyl)disulfide.

Suitable organoalkoxymercaptosilanes include, but are not limited to, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane. Such organoalkoxymercaptosilanes may be capped with a blocking group, i.e., the mercapto hydrogen atom is replaced with another group. A representative example of a capped organoalkoxymercaptosilane coupling agent is a liquid 3-octanoylthio-1-propyltriethoxysilane, commercially available as NXT™ Silane from Momentive Performance Materials Inc.

Mixtures of various organosilane polysulfide compounds and organoalkoxymercaptosilanes can be used.

The carbon black(s) utilized may include any of the commonly available, commercially-produced carbon blacks. These include those having a surface area (EMSA) of at least 20 $m^2$/gram and in other embodiments at least 35 $m^2$/gram up to 200 $m^2$/gram or higher. Surface area values include those determined by ASTM test D-1765 using the cetyltrimethylammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used. Exemplary carbon blacks include those bearing ASTM designation (D-1765-82a) N-110, N-220, N-339, N-330, N-351, N-550, and N-660. In one or more embodiments, the carbon black may include oxidized carbon black.

In certain embodiments of the sulfur-vulcanizable rubber compound, other conventional rubber additives may also be added to the rubber compositions. These include, for example, process oils, plasticizers, anti-degradants such as antioxidants and anti-ozonants, curing agents and the like.

Typically, process oils are added to tread rubber compositions as a softener. Non-limiting examples of process oils used in the tread rubber compositions disclosed herein include paraffinic, naphthenic, and aromatic process oils, and the like. In one or more embodiments according to the first-sixth embodiments disclosed herein, the process oil is an aromatic process oil. In other embodiments, the process oil is a low polycyclic aromatic content ("low PCA") oil containing less than 2%. Other useful oils include those containing less than 3 wt %, less than 2 wt % or less than 1 wt % of polycyclic aromatic compounds (as measured by IP346) ("low PCA oils"). Such low PCA oils are increasingly used in an effort to reduce the amount of polycyclic aromatic compounds present in rubbers used in tires. Commercially available low PCA oils include various naphthenic oils, mild extraction solvates (MES) and treated distillate aromatic extracts (TDAE).

In certain embodiments, the sulfur-vulcanizable rubber compound, especially when used for tire treads, preferably contains between 1 and 100 phr process oil. In one or more embodiments, the amount of process oil is between 2 and 100 phr; in other embodiments, between 1 and 50 phr; in others, between 2 and 50 phr. In still other embodiments, the amount of process oil is between 1 and 20 phr; in others, between 2 and 20 phr; in others, between 1 and 10 phr; in still others, between 2 and 10 phr.

When forming a tread rubber composition, generally all ingredients may be mixed with standard equipment such as, e.g., Banbury or Brabender mixers. Typically, mixing occurs in two or more stages. During the first stage (also known as the masterbatch stage), mixing typically is begun at temperatures of about 100° C. to about 130° C. and increases until a so-called drop temperature, typically about 165° C., is reached.

Where a rubber composition includes fillers other than (or in addition to) carbon black, a separate re-mill stage often is employed for separate addition of the other fillers. This stage often is performed at temperatures similar to, although often slightly lower than, those employed in the masterbatch stage, i.e., ramping from about 90° C. to a drop temperature of about 150° C. For purposes of this application, the term "masterbatch" means the composition that is present during the masterbatch stage or the composition as it exists during any re-mill stage, or both.

Curatives, accelerators, etc., are generally added at a final mixing stage. To avoid undesirable scorching and/or premature onset of vulcanization, this mixing step often is done at lower temperatures, e.g., starting at about 60° C. to about 65° C. and not going higher than about 105° to about 110° C. For purposes of this application, the term "final batch" means the composition that is present during the final mixing stage.

Subsequently, the compounded mixture is processed (e.g., milled) into sheets prior to being formed into any of a variety of components and then vulcanized, which typically occurs at about 5° to about 15° C. higher than the highest temperatures employed during the mixing stages, most commonly about 170° C.

In certain embodiments of the sulfur-vulcanizable rubber compound, the compound will exhibit a tan δ at 60° C., 10 Hz and 2% strain of less than 0.2 after curing with 0.5-2 phr of sulfur at 135-165° C. for 5-40 minutes. In certain preferred embodiments, the compound will exhibit a tan δ at 60° C., 10 Hz and 2% strain of less than 0.15 after curing with 0.5-2 phr of sulfur at 135-165° C. for 5-40 minutes. While the sulfur-vulcanizable rubber compound may be sold in a vulcanized or non-vulcanized form, the tan δ can only be measured upon a cured compound and, thus, exemplary cure conditions that should be employed when measuring the tan δ of a compound in question have been specified. Thus, the phrase sulfur-vulcanizable compound as used herein should be understood to mean a compound that is capable of being sulfur-vulcanized but that has not necessarily been vulcanized. A compound that has already been sulfur-vulcanized (i.e., cured) should be understood to be a sulfur-vulcanizable compound since it was capable of being vulcanized.

In certain embodiments of the sulfur-vulcanizable rubber compound, the compound will exhibit an elongation at break at room temperature (i.e., 23° C.) of at least 450 MPa after curing with 0.5-2 phr of sulfur at 135-165° C. for 5-40 minutes. In certain preferred embodiments, the compound will exhibit an elongation at break at room temperature of at least 500 MPa after curing with 0.5-2 phr of sulfur at 135-165° C. for 5-40 minutes. While the sulfur-vulcanizable rubber compound may be sold in a vulcanized or non-vulcanized form, the elongation at break can only be measured upon a cured compound and, thus, exemplary cure conditions that should be employed when measuring the elongation at break of a compound in question have been specified.

Sulfur-Vulcanized Rubber Compound

As previously discussed, the sulfur-vulcanized rubber compound contains 10-100 phr of non-*Hevea* rubber sourced from *Taraxacum kok-saghyz*, *Scorzonera tau-saghyz*, *Scorzonera uzbekistanica*, and combinations that contains no more than 3.5% by weight total impurities, with no more than 2% by weight volatiles, no more than 1% by weight residue and no more than 0.5% by weight combustibles.

In certain embodiments of the sulfur-vulcanized rubber compound, the non-*Hevea* rubber sourced from *Taraxacum kok-saghyz*, *Scorzonera tau-saghyz*, *Scorzonera uzbekistanica*, and combinations thereof utilizes purified rubber that contains no more than 3% by weight total impurities. In other embodiments of the sulfur-vulcanized rubber compound, the rubber sourced from *Taraxacum kok-saghyz*, *Scorzonera tau-saghyz*, *Scorzonera uzbekistanica*, and combinations thereof utilizes purified rubber that contains no more than 2.5% by weight total impurities.

In certain preferred embodiments of the sulfur-vulcanized rubber compound, the rubber is sourced from *Taraxacum kok-saghyz*. In certain of these embodiments, the source is plant matter that comprises at least 90% or at least 95% by weight roots from *Taraxacum kok-saghyz*.

As previously discussed, the sulfur-vulcanized rubber compound contains 0.5-6 phr of sulfur. In preferred embodiments, the sulfur-vulcanized rubber compound contains 1.2-4 phr of sulfur. Sulfur may be added in the form of elemental sulfur, via a sulfur donor or by a combination of both.

As previously discussed, the sulfur-vulcanized rubber compound contains at least one accelerator. The particular vulcanization accelerator or accelerators is not particularly limited. In preferred embodiments, the at least one accelerator is amine-containing Non-limiting examples of the at least one accelerator include: diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), 2-(morpholinothio)benzothiazole (MBS), N-tert-butyl-2-benzothiazole sulfonamide (TBBS), N-cyclohexyl-2-benzothiazole sulfonamide (CBS), and mixtures thereof. The amount of vulcanization accelerator(s) used in the sulfur-vulcanized rubber compound may be from about 0.1 to about 10 phr or from about 1 to about 5 phr.

In certain embodiments of the sulfur-vulcanized rubber compound, the non-*Hevea* rubber sourced from *Taraxacum kok-saghyz*, *Scorzonera tau-saghyz*, *Scorzonera uzbekistanica*, and combinations thereof utilizes purified rubber that contains no more than 3% by weight total impurities. In other embodiments of the sulfur-vulcanized rubber compound, the rubber sourced from *Taraxacum kok-saghyz*, *Scorzonera tau-saghyz*, *Scorzonera uzbekistanica*, and combinations thereof utilizes purified rubber that contains no more than 2.5% by weight total impurities.

In certain preferred embodiments of the sulfur-vulcanized rubber compound, the rubber is sourced from *Taraxacum kok-saghyz*. In certain of these embodiments, the source is plant matter that comprises at least 90% or at least 95% by weight roots from *Taraxacum kok-saghyz*.

As previously discussed, the sulfur-vulcanized rubber compound contains 0-90 phr of at least one synthetic conjugated-diene containing polymer or copolymer. In certain embodiments, the sulfur-vulcanized rubber compound contains 10-90 phr of at least one synthetic conjugated-diene containing polymer or copolymer. In yet other embodiments, the sulfur-vulcanized rubber compound contains 40-90 phr of at least one synthetic conjugated-diene containing polymer or copolymer. Non-limiting examples of the synthetic conjugated diene containing polymer or copolymer include polybutadiene, polyisoprene and styrene-butadiene copolymer. In certain embodiments, the sulfur-vulcanized compound contains 0-90 phr of *Hevea*-natural rubber. In other embodiments, the sulfur-vulcanizable compound contains 10-60 phr of *Hevea*-natural rubber. In certain embodiments, the 0-90 phr of *Hevea* natural rubber together with the rubber sourced from *Taraxacum kok-saghyz*, *Scorzonera tau-saghyz*, *Scorzonera uzbekistanica*, and combinations thereof, comprises 100 phr of the sulfur-vulcanized rubber compound; in some such embodiments the non-*Hevea* rubber may be viewed as a partial replacement for *Hevea* rubber. Alternatively, in other embodiments, the sulfur-vulcanized rubber compound may comprise 10-100 phr of purified rubber sourced from *Taraxacum kok-saghyz*, *Scorzonera tau-saghyz*, *Scorzonera uzbekistanica*, and combinations thereof (with a no more than 3% by weight total impurities, or no more than 2.5% by weight total impurities);

0-90 phr of at least one synthetic conjugated-diene containing polymer or copolymer; and 0-90 phr of at *Hevea* natural rubber.

As previously discussed, the sulfur-vulcanized rubber compound contains 20-200 phr of at least one reinforcing filler selected from the group consisting of carbon black, silica, calcium carbonate, clay, talc, barite, wollastonite, mica, precipitated silicates, and diatomite. Various combinations of reinforcing fillers may be utilized. In preferred embodiments, the sulfur-vulcanized rubber compound contains at least one of silica and carbon black. In preferred embodiments, the at least one reinforcing filler is present in an amount of 5-100 phr.

The silica utilized (silicon dioxide) may include wet-process, hydrated silica produced by a chemical reaction in water, and precipitated as ultra-fine spherical particles. In certain of the foregoing embodiments, the silica has a surface area of about 32 to about 400 $m^2/g$, in another embodiment about 100 to about 250 $m^2/g$, and in yet another embodiment, about 150 to about 220 $m^2/g$. The pH of the silica filler in certain of the foregoing embodiments is about 5.5 to about 7 and in another embodiment about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™ 1165MP and 175GRPlus (Rhodia), Vulkasil™ (Bary AG), Ultrasil™ VN2, VN3 (Degussa), and HuberSil™ 8745 (Huber).

If silica is used as a filler, it may be desirable to use a coupling agent to couple the silica to the polymer. Numerous coupling agents are known, including but not limited to organosulfide polysulfides and organoalkoxymercaptosilanes. Generally, any organosilane polysulfide may be used. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricycloneoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxyethoxypropoxysilyl 3'-diethoxybutoxy-silylpropyl tetrasulfide, 2,2'-bis(dimethylmethoxysilylethyl)disulfide, 2,2'-bis(dimethylsecbutoxysilylethyl)trisulfide, 3,3'-bis(methylbutylethoxysilylpropyl)tetrasulfide, 3,3'-bis(di t-butylmethoxysilylpropyl)tetrasulfide, 2,2'-bis(phenylmethylmethoxysilylethyl)trisulfide, 3,3'-bis(diphenyl isopropoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methyl ethoxypropoxysilylethyl)tetrasulfide, 3,3'-bis(diethylmethoxysilylpropyl)tetrasulfide, 3,3'-bis(ethyldi-secbutoxysilylpropyl)disulfide, 3,3'-bis(propyldiethoxysilylpropyl) disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl) trisulfide, 3,3'-bis(trimethoxysilyl-2-methylpropyl) tetrasulfide and 3,3'-bis(dimethoxyphenylsilyl-2-methylpropyl)disulfide.

Suitable organoalkoxymercaptosilanes include, but are not limited to, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane. Such organoalkoxymercaptosilanes may be capped with a blocking group, i.e., the mercapto hydrogen atom is replaced with another group. A representative example of a capped organoalkoxymercaptosilane coupling agent is a liquid 3-octanoyl-thio-1-propyltriethoxysilane, commercially available as NXT™ Silane from Momentive Performance Materials Inc.

Mixtures of various organosilane polysulfide compounds and organoalkoxymercaptosilanes can be used.

The carbon black(s) utilized may include any of the commonly available, commercially-produced carbon blacks. These include those having a surface area (EMSA) of at least 20 $m^2$/gram and in other embodiments at least 35 $m^2$/gram up to 200 $m^2$/gram or higher. Surface area values include those determined by ASTM test D-1765 using the cetyltrimethylammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used. Exemplary carbon blacks include those bearing ASTM designation (D-1765-82a) N-110, N-220, N-339, N-330, N-351, N-550, and N-660. In one or more embodiments, the carbon black may include oxidized carbon black.

In certain embodiments of the sulfur-vulcanized rubber compound, other conventional rubber additives may also be added to the rubber compositions. These include, for example, process oils, plasticizers, anti-degradants such as antioxidants and anti-ozonants, curing agents and the like.

Typically, process oils are added to tread rubber compositions as a softener. Non-limiting examples of process oils used in the tread rubber compositions disclosed herein include paraffinic, naphthenic, and aromatic process oils, and the like. In one or more embodiments according to the first-sixth embodiments disclosed herein, the process oil is an aromatic process oil. In other embodiments, the process oil is a low polycyclic aromatic content ("low PCA") oil containing less than 2%. Other useful oils include those containing less than 3 wt %, less than 2 wt % or less than 1 wt % of polycyclic aromatic compounds (as measured by IP346) ("low PCA oils"). Such low PCA oils are increasingly used in an effort to reduce the amount of polycyclic aromatic compounds present in rubbers used in tires. Commercially available low PCA oils include various naphthenic oils, mild extraction solvates (MES) and treated distillate aromatic extracts (TDAE).

In certain embodiments, the sulfur-vulcanized rubber compound, especially when used for tire treads, preferably contains between 1 and 100 phr process oil. In one or more embodiments, the amount of process oil is between 2 and 100 phr; in other embodiments, between 1 and 50 phr; in others, between 2 and 50 phr. In still other embodiments, the amount of process oil is between 1 and 20 phr; in others, between 2 and 20 phr; in others, between 1 and 10 phr; in still others, between 2 and 10 phr.

When forming a tread rubber composition, generally all ingredients may be mixed with standard equipment such as, e.g., Banbury or Brabender mixers. Typically, mixing occurs in two or more stages. During the first stage (also known as the masterbatch stage), mixing typically is begun at temperatures of about 100° C. to about 130° C. and increases until a so-called drop temperature, typically about 165° C., is reached.

Where a rubber composition includes fillers other than (or in addition to) carbon black, a separate re-mill stage often is employed for separate addition of the other fillers. This stage often is performed at temperatures similar to, although often slightly lower than, those employed in the masterbatch stage, i.e., ramping from about 90° C. to a drop temperature of about 150° C. For purposes of this application, the term "masterbatch" means the composition that is present during the masterbatch stage or the composition as it exists during any re-mill stage, or both.

Curatives, accelerators, etc., are generally added at a final mixing stage. To avoid undesirable scorching and/or premature onset of vulcanization, this mixing step often is done at lower temperatures, e.g., starting at about 60° C. to about 65° C. and not going higher than about 105° C. to about 110° C. For purposes of this application, the term "final batch" means the composition that is present during the final mixing stage.

Subsequently, the compounded mixture is processed (e.g., milled) into sheets prior to being formed into any of a variety of components and then vulcanized, which typically occurs at about 5° C. to about 15° C. higher than the highest temperatures employed during the mixing stages, most commonly about 170° C.

In certain embodiments of the sulfur-vulcanized rubber compound, the compound will exhibit a tan δ at 60° C., 10 Hz and 2% strain of less than 0.2 after curing with 0.5-2 phr of sulfur at 135-165° C. for 5-40 minutes. In certain preferred embodiments, the compound will exhibit a tan δ at 60° C., 10 Hz and 2% strain of less than 0.15 after curing with 0.5-2 phr of sulfur at 135-165° C. for 5-40 minutes. The phrase sulfur-vulcanized rubber compound should be understood to refer to a compound that has been vulcanized. However, the method of vulcanization is not particularly limited and the cure conditions for tan δ have been provided only in an effort to identify the conditions that should be used during testing to determining whether a particular compound has the specified properties.

In certain embodiments of the sulfur-vulcanized rubber compound, the compound will exhibit an elongation at break at room temperature (i.e., 23° C.) of at least 450 MPa after curing with 0.5-2 phr of sulfur at 135-165° C. for 5-40 minutes. In certain preferred embodiments, the compound will exhibit an elongation at break at room temperature of at least 500 MPa after curing with 0.5-2 phr of sulfur at 135-165° C. for 5-40 minutes. Again, the phrase sulfur-vulcanized rubber compound should be understood to refer to a compound that has been vulcanized. However, the method of vulcanization is not particularly limited and the cure conditions for elongation at break have been provided only in an effort to identify the conditions that should be used during testing to determining whether a particular compound has the specified properties.

Example 1 (Purification of Rubber from TKS Plant Matter)

As described in more detail herein, rubber was isolated from a sample of TKS harvested plant matter and purified according to the following procedure. Raw TKS harvested plant matter was added to toluene at room temperature (the plant matter was added in a weight to volume ratio of 1:20 or 100 grams harvested plant matter to 2000 mL toluene) by adding both harvested plant matter and toluene to an Erlenmeyer flask with stirring (the flask was corked after addition of the materials in order to minimize any evaporation of solvent). The TKS harvested plant matter consisted of primarily root material from *Taraxacum kok-saghyz* plants (the plants were approximately 2-3 years old at the time of harvest) that had been harvested, washed thoroughly with water to remove all visible dirt and dried. (Prior to mixing with the toluene, the washed and dried roots had been pebble-milled, screened and separated through a water-based flotation process in order to separate a majority of the cellulose plant material from the rubber. However, a certain amount of cellulose plant material and other impurities remained in the TKS harvested plant matter and the purpose of the purification was to isolate the rubber from the cellulose plant material and other impurities.) The TKS harvested plant matter was allowed to soak in the toluene for 6-12 hours.

An antioxidant (Santoflex 13) was added to the toluene solution in an amount of 1% by weight (based on the total weight of plant matter). After soaking for 6-12 hours, the solution (including both toluene and harvested plant matter) was centrifuged using a IEC/EXD centrifuge by Damon IEC at 4000 rpm for 2 hours. After the centrifuge was stopped, it was observed that solids had precipitated at the bottom of the containers. The viscous toluene phase was decanted from the solids and poured into aluminum pans (about 15-17% of solids based on the original weight of the harvested TKS plant material remained as precipitates/solids in the bottom of the flask). The aluminum pans were placed into a fume hood and allowed to dry overnight (approximately 8-10 hours) at room temperature. The next morning the toluene had evaporated leaving behind rubber sheets in the pans. These sheets were collected by lifting them from the pan and cut into small pieces (of approximately 1×1 cm in size) and added to acetone. The rubber and acetone were present in an amount of 5% by weight rubber based upon the total volume of the acetone solvent (i.e., at a ratio of 5 g rubber to 100 mL acetone). The mixture of rubber pieces and acetone was allowed to soak overnight (approximately 8-10 hours) at 50° C. (the mixture was contained within a closed container that allowed for recondensation of any evaporated solvent). The next morning the acetone (containing impurities such as terpenes, resins and fatty acids) was decanted from the rubber pieces.

The rubber pieces that remained after the acetone had been decanted were dried under vacuum at 23° C. Analysis of the "purified" rubber was performed using thermogravimetric analysis ("TGA") and microscopy in order to determine the relative amounts of rubber and various impurities. For the TGA, a Q5000 model from TA Instruments was used with a standard heating protocol from room temperature to 850° C. Results are reported below in Table 1.

Example 2—Preparation of Rubber Compounds Using TKS-Sourced Natural Rubber

In order to evaluate the effect of impurity levels on rubber compounds, rubber compounds were prepared using purified TKS-sourced natural rubber with varying impurity levels. (The abbreviation "TKS" is used to refer to *Taraxacum kok-saghyz*.) A rubber compound containing commercial *Hevea*-sourced natural rubber was used as a control. The TKS-sourced natural rubber indicated below as "Compounded TKS" was obtained from a sample of Harvested TKS that was purified using the procedure described in Example 1, above. The TKS-sourced natural rubber indicated below as "Harvested TKS" was a sample provided by the Ohio State University Agricultural Research and Development Center; the method used to purify the Harvested TKS included pebble-milling, screening and separation by water-flotation (more precise details were not available). Each natural rubber source was found to contain impurities in the amounts listed in Table 1 below. The rubber compounds were prepared using the formulation provided in Table 2.

TABLE 1

|  | Harvested TKS | Compounded TKS | Commercial *Hevea* NR |
| --- | --- | --- | --- |
| Polymer weight % | 95.74 | 97.90 | 97.41 |
| Combustible weight % | 1.35 | 0.02 | 0.472 |
| Volatiles weight % | 1.52 | 1.32 | 1.89 |
| Residue weight % | 1.39 | 0.75 | 0.225 |
| Total impurity weight % | 4.26 | 2.09 | 2.59 |

TABLE 2

| Ingredient | Amount (phr) |
| --- | --- |
| Master Batch | |
| Rubber | 100 |
| Carbon black (N343) | 42 |
| Stearic acid | 2 |
| Wax[1] | 1.5 |
| Antioxidant[2] | 2 |
| Resin[3] | 1 |
| Final Batch | |
| Zinc oxide | 3.5 |
| Antioxidant[4] | 0.3 |
| Accelerator[5] | 1 |
| Sulfur | 1.3 |

[1]microcrystalline wax blend (55% paraffin) by Hallstar
[2]Santoflex 13
[3]Hydrocarbon resin C5-C9 blend by Resinall
[4]2,2,4-trimethyl 1,2-hydroquinoline ("TMQ")
[5]N-cyclohexyl benzothiazole sulfenamide ("CBS")

First, a master batch was prepared in a 65-gram Brabender mixer using the ingredients listed in Table 2 under "Master Batch." At time=0, all polymer (i.e, the strips of rubber) was added into the mixer at 110° C. The mixer was set to 70 rpm. At time=30 sec. all the carbon black and the master batch ingredients were added into the batch. Once a total mixing time of 4 min. or a drop temperature of 145-150° C. was reached mixing was stopped and the batch was removed from the mixer. Compounded rubber was then rolled through a mill and cut into small strips for feeding for the final mix. Then, the additional ingredients listed in Table 5 under "Final Batch" were added. At time=0, all polymer (i.e., the strips of rubber) and the final batch ingredients were consecutively added into the mixer at 80° C. The mixer was set to 50 rpm. Once a total mixing time of 1 min. or a drop temperature of 110° C. was reached mixing was stopped and the batch was removed from the mixer. Compounded rubber was then rolled through a mill and sheeted out for curing.

Sample 1 was a control that contained 100 phr commercially available *Hevea* natural rubber. Samples 2-5 contained 100 phr of Compounded TKS. Samples 3-5 also contained an additional ingredient at amounts of 5, 10 and 15 phr, respectively, that constituted TKS Impurities. The TKS Impurities were a combination of ash, cellulose, resins and other plant matter that are typically found in TKS-sourced natural rubber. The TKS Impurities, which had been extracted from the TKS harvested plant matter during the first purification stage and precipitated in the bottom of the beaker/flask (and then dried at room temperature to remove toluene solvent) were added to Samples 3-5 during the master batch stage.

The rubber compounds prepared as Samples 1-5 were analyzed by TGA and results are shown in Table 3 below. The results show that the total impurity levels (volatiles+ residue) are comparable for the control Sample 1 and the Compounded TKS Sample 2. The total impurity levels are noticeably higher for Samples 3-5 due to the addition of TSK Impurities into the rubber compounds. The percent combustibles were omitted from the total impurity calculation because they are primarily due to the presence of carbon black in the rubber compound.

TABLE 3

|  | Sample 1 | Sample 2 | Sample 3 | Sample 4 | Sample 5 |
| --- | --- | --- | --- | --- | --- |
| Polymer weight % | 65.82 | 65.28 | 63.89 | 63.81 | 63.75 |
| Combustible weight % | 26.58 | 26.89 | 26.56 | 26.19 | 25.58 |
| Volatiles weight % | 4.77 | 5.07 | 6.63 | 6.59 | 6.97 |
| Residue weight % | 2.84 | 2.78 | 2.91 | 3.41 | 3.71 |
| Total impurity weight % | 7.61 | 7.85 | 9.54 | 10.00 | 10.68 |

After curing at 145° C. for t90×1.5 minutes (t90 is the optimum vulcanization time obtained from Monsanto Rheometer for rubber), Samples 1-5 were subjected to physical testing for various dynamic and tensile properties and results are reported in Table 4 below. The value reported as t90 is a measure of the time (in minutes) required to reach 90% completion in curing. The viscoelastic properties of the cured rubber compounds were measured using the following methods. The first method is a temperature sweep test conducted with an Advanced Rheometric Expansion System (ARES) from TA Instruments. The test specimen has a rectangular geometry having a length of 47 mm, a thickness of 2 mm, and a width of 12.7 mm. The length of specimen between the grips on the test machine, i.e., the gap, is approximately 27 mm. The test is conducted using a frequency of 3.14 rad/sec. The temperature is started at −100° C. and increased to 100° C. The strain is 0.5% for the temperature range of −100° C. to −21° C., and 2% for the temperature range of −20° C. to 100° C. The second viscoelastic test is a strain sweep conducted with an Advanced Rheometric Expansion System (ARES) from TA Instruments. The test specimen has a cylindrical button geometry having a diameter of 9.27 mm and a 15.6 mm length. The test is conducted using a frequency of 3.14 rad/sec. The temperature is held constant at the desired temperature, i.e., 60° C. The strain is swept from 0.03% to 15%. The third viscoelastic test is a dynamic compression test done with a Dynastat™ mechanical spectrometer (Dynastatics Instruments Corp.; Albany, N.Y.) using a cylindrical test specimen (9.27 mm diameter×15.6 mm height). The sample is compressed under a static load of 2 kg before testing. After it reached an equilibrium state, the test started with a dynamic compression load of 1.25 kg at a frequency of 1 Hz. The sample was then dynamically compressed and then extended and the resultant hysteresis (tangent delta) was then recorded.

Tensile mechanical properties were determined following the guidelines, but not restricted to, the standard procedure described in ASTM-D412, using ring samples with a dimension of 1.27 mm in width and 1.91 mm in thickness. A specific gauge length of 25.4 mm was used for the tensile test. Specimens are strained at a constant rate and the resulting force is recorded as a function of extension (strain). Force readings are expressed as engineering stresses by reference to the original cross-sectional area of the test piece. The specimens are tested at 23° C. Breaking strength/tensile strength (Tb), elongation at break/elongation performance (Eb), Tb×Eb and modulus at 23° C. are also reported. The same tensile mechanical properties were also tested at 100° C.

However, Compounded TKS showed better (i.e., lower) hysteresis loss (tan δ) at 60° C. which is generally understood to be a predictor of better rolling resistance. While the tensile strength (Eb) of the *Hevea* natural rubber of Sample 1 was similar to that of Compounded TKS without any additional impurities in Sample 2, Sample 2 displayed better elongation performance (Eb) at room temperature. Elongation performance is generally understood to be a predictor of flexibility and high-temperature performance. Once the additional amounts of TSK Impurities were added into Samples 3, 4 and 5, the physical performance of the rubber compounds was adversely affected as shown by the reduction in Tb×Eb and increased ΔG' values. Overall, samples 3 and 4 showed decreased elastic properties (i.e., both 50 and 100° C., Tb and Eb values which are an indication of strength in the TKS compound. Sample 5 (containing Compounded TKS with 15 phr impurities) showed substantially decreased mechanical performance as compared to Sample 1 and Sample 2, especially in terms of elongation and tensile strength.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally

TABLE 4

|  | Sample 1 | Sample 2 | Sample 3 | Sample 4 | Sample 5 |
| --- | --- | --- | --- | --- | --- |
| Commercial *Hevea* NR (phr) | 100 | | | | |
| Compounded TKS (phr) | | 100 | 100 | 100 | 100 |
| TKS Impurities (phr) | | | 5 | 10 | 15 |
| t90 (minutes) | 12.27 | 11.99 | 13.35 | 12.93 | 12.24 |
| G' (TS, 0° C., 10 Hz, 2%) (MPa) | 6.74 | 6.37 | 10.5 | 12.5 | 11.20 |
| tan δ (TS, 0° C., 10 Hz, 2%) | 0.195 | 0.195 | 0.281 | 0.274 | 0.276 |
| G' (TS, 60° C., 10 Hz, 2%) (MPa) | 3.89 | 3.91 | 5.44 | 6.20 | 5.80 |
| tan δ (TS, 60° C., 10 Hz, 2%) | 0.125 | 0.105 | 0.200 | 0.201 | 0.175 |
| ΔG' (SS, 60° C., 15 Hz, 0.03%-15%) | 1.48 | 1.43 | 2.12 | 2.02 | 3.66 |
| 50% Modulus @ 23° C. (MPa) | 1.34 | 1.39 | 1.65 | 2.06 | 1.90 |
| 200% Modulus @ 23° C. (MPa) | 7.39 | 7.21 | 7.76 | 8.11 | 8.03 |
| Tb @ 23° C. (MPa) | 30.3 | 30.6 | 26.0 | 22.5 | 19.4 |
| Eb @ 23° C. (MPa) | 524 | 543 | 503 | 434 | 399 |
| Tb × Eb @ 23° C. (MPa) | 15877 | 16615 | 13078 | 9765 | 7741 |
| 50% Modulus @ 100° C. (MPa) | 1.22 | 1.40 | 1.23 | 1.41 | 1.59 |
| 200% Modulus @ 100° C. (MPa) | 4.95 | 5.29 | 4.21 | 4.07 | 5.00 |
| Tb @ 100° C. (MPa) | 22.0 | 20.5 | 16.8 | 14.9 | 14.00 |
| Eb @ 100° C. (MPa) | 640 | 576 | 593 | 563 | 480 |
| Tb × Eb @ 100° C. (MPa) | 14080 | 11808 | 9962 | 8389 | 6720 |

From a review of the data, it can be concluded that the control Sample 1 and the Compounded TKS without any additional impurities (Sample 2) exhibit similar physical properties. The time required to reach 90% completion in curing (t90) is very similar in both Sample 1 and Sample 2. Addition of the impurities (i.e., Samples 3-5) caused cure times to slightly increase. The overall dynamic and tensile properties of Samples 1 and 2 were similar showing that the Compounded TKS without any additional impurities performs comparably to commercial *Hevea* natural rubber. Elastic modulus values (G') of Sample 1 and Sample 2 were almost identical within the temperature range evaluated.

mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for isolating purified natural rubber from non-*Hevea* plant matter comprising:
   a. providing harvested plant matter comprising at least 90% by weight of roots sourced from *Taraxacum kok-saghyz, Scorzonera tau-saghyz, Scorzonera uzbekistanica*, and combinations thereof;
   b. mixing the harvested plant matter with at least one rubber-soluble organic solvent at a weight ratio of from 2:100 to 20:100 thereby producing a quantity of dissolved rubber and a quantity of solids;
   c. isolating the dissolved rubber from the solids to produce a dissolved rubber fraction that contains no more than 2% by weight solids based on the total weight of the dissolved rubber fraction;
   d. removing the at least one rubber-soluble organic solvent from the dissolved rubber fraction to produce a solid rubber mass;
   e. mixing the solid rubber mass with at least one rubber-insoluble organic solvent at a weight ratio of 2:100 to 20:100 thereby dissolving a quantity of impurities from the solid rubber mass; and
   f. isolating the remaining solid rubber mass from the at least one rubber-insoluble organic solvent to produce a purified natural rubber
   wherein said purified natural rubber contains no more than 3.5% by weight total impurities based upon the total weight of the purified natural rubber, wherein the total impurities present in the purified natural rubber comprises no more than 2% by weight volatiles, no more than 1% by weight residue and no more than 0.5% by weight combustibles.

2. The method according to claim 1, wherein the harvested plant matter comprises at least 95% by weight roots from *Taraxacum kok-saghyz*.

3. The method according to claim 2, wherein the harvested plant matter and the at least one rubber-soluble organic solvent are allowed to remain in contact for 4-24 hours prior to isolating the dissolved rubber from the solids.

4. The method according to claim 3, wherein the at least one rubber-insoluble organic solvent is selected from the group consisting of alcohols, having 1 to 8 carbon atoms; ethers and esters having from 2 to 8 carbon atoms; cyclic ethers having from 4 to 8 carbon atoms; ketones having from 3 to 8 carbon atoms; and combinations thereof; and
   the at least one rubber-soluble organic solvent is selected from the group consisting of alkanes having from 4 to 9 carbon atoms; cycloalkanes and alkyl cycloalkanes having from 5 to 10 carbon atoms; aromatics and alkyl substituted aromatics having from 6 to 12 carbon atoms, and combinations thereof.

5. The method according to claim 2, wherein the at least one rubber-insoluble organic solvent is selected from the group consisting of alcohols, having 1 to 8 carbon atoms; ethers and esters having from 2 to 8 carbon atoms; cyclic ethers having from 4 to 8 carbon atoms; ketones having from 3 to 8 carbon atoms; and combinations thereof; and
   the at least one rubber-soluble organic solvent is selected from the group consisting of alkanes having from 4 to 9 carbon atoms; cycloalkanes and alkyl cycloalkanes having from 5 to 10 carbon atoms; aromatics and alkyl substituted aromatics having from 6 to 12 carbon atoms, and combinations thereof.

6. The method according to claim 1, wherein the harvested plant matter and the at least one rubber-soluble organic solvent are allowed to remain in contact for 4-24 hours prior to isolating the dissolved rubber from the solids.

7. The method according to claim 6, wherein the at least one rubber-insoluble organic solvent is selected from the group consisting of alcohols, having 1 to 8 carbon atoms; ethers and esters having from 2 to 8 carbon atoms; cyclic ethers having from 4 to 8 carbon atoms; ketones having from 3 to 8 carbon atoms; and combinations thereof; and
   the at least one rubber-soluble organic solvent is selected from the group consisting of alkanes having from 4 to 9 carbon atoms; cycloalkanes and alkyl cycloalkanes having from 5 to 10 carbon atoms; aromatics and alkyl substituted aromatics having from 6 to 12 carbon atoms, and combinations thereof.

8. The method according to claim 1, wherein the at least one rubber-insoluble organic solvent is selected from the group consisting of alcohols, having 1 to 8 carbon atoms; ethers and esters having from 2 to 8 carbon atoms; cyclic ethers having from 4 to 8 carbon atoms; ketones having from 3 to 8 carbon atoms; and combinations thereof; and
   the at least one rubber-soluble organic solvent is selected from the group consisting of alkanes having from 4 to 9 carbon atoms; cycloalkanes and alkyl cycloalkanes having from 5 to 10 carbon atoms; aromatics and alkyl substituted aromatics having from 6 to 12 carbon atoms, and combinations thereof.

9. The method according to claim 1, wherein the isolating of (c) uses a centrifuge.

10. The method according to claim 1, wherein the isolating of (c) uses flotation.

11. The method according to claim 1, wherein the isolating of (c) uses filtering.

12. A method for isolating purified natural rubber from non-*Hevea* plant matter comprising:
   a. providing harvested plant matter comprising at least 90% by weight of roots sourced from *Taraxacum kok-saghyz, Scorzonera tau-saghyz, Scorzonera uzbekistanica*, and combinations thereof;
   b. mixing the harvested plant matter with at least one non-polar organic solvent at a weight ratio of from 2:100 to 20:100 thereby producing a quantity of dissolved rubber and a quantity of solids;
   c. isolating the dissolved rubber from the solids to produce a dissolved rubber fraction that contains no more than 2% by weight solids based on the total weight of the dissolved rubber fraction;
   d. removing the at least one non-polar organic solvent from the dissolved rubber fraction to produce a solid rubber mass;
   e. mixing the solid rubber mass with at least one polar organic solvent at a weight ratio of 2:100 to 20:100 thereby dissolving a quantity of impurities from the solid rubber mass; and
   f. isolating the remaining solid rubber mass from the at least one polar organic solvent to produce a purified natural rubber
   wherein said purified natural rubber contains no more than 3.5% by weight total impurities based upon the total weight of the purified natural rubber, wherein the total impurities present in the purified natural rubber comprises no more than 2% by weight volatiles, no more than 1% by weight residue and no more than 0.5% by weight combustibles.

13. The method according to claim 12, wherein the harvested plant matter and the at least one non-polar organic solvent are allowed to remain in contact for 4-24 hours prior to isolating the dissolved rubber from the solids.

14. The method according to claim 13, wherein the at least one polar organic solvent is selected from the group consisting of alcohols, having 1 to 8 carbon atoms; ethers and esters having from 2 to 8 carbon atoms; cyclic ethers having from 4 to 8 carbon atoms; ketones having from 3 to 8 carbon atoms; and combinations thereof; and the at least one non-polar organic solvent is selected from the group consisting of alkanes having from 4 to 9 carbon atoms; cycloalkanes and alkyl cycloalkanes having from 5 to 10 carbon atoms; aromatics and alkyl substituted aromatics having from 6 to 12 carbon atoms, and combinations thereof.

15. The method according to claim 12, wherein the at least one polar organic solvent is selected from the group consisting of alcohols, having 1 to 8 carbon atoms; ethers and esters having from 2 to 8 carbon atoms; cyclic ethers having from 4 to 8 carbon atoms; ketones having from 3 to 8 carbon atoms; and combinations thereof; and the at least one non-polar organic solvent is selected from the group consisting of alkanes having from 4 to 9 carbon atoms; cycloalkanes and alkyl cycloalkanes having from 5 to 10 carbon atoms; aromatics and alkyl substituted aromatics having from 6 to 12 carbon atoms, and combinations thereof.

16. The method according to claim 12, wherein the isolating of (c) uses a centrifuge.

17. The method according to claim 12, wherein the isolating of (c) uses flotation.

18. The method according to claim 12, wherein the isolating of (c) uses filtering.

\* \* \* \* \*